US008613249B2

(12) United States Patent
France et al.

(10) Patent No.: US 8,613,249 B2
(45) Date of Patent: Dec. 24, 2013

(54) COOKING APPARATUS AND FOOD PRODUCT

(75) Inventors: David W. France, Omaha, NE (US); Adam Pawlick, Omaha, NE (US)

(73) Assignee: ConAgra Foods RDM, Inc., Omaha, NE (US)

( * ) Notice: Subject to any disclaimer, the term of this patent is extended or adjusted under 35 U.S.C. 154(b) by 861 days.

(21) Appl. No.: 11/890,297

(22) Filed: Aug. 3, 2007

(65) Prior Publication Data

US 2009/0035433 A1 Feb. 5, 2009

(51) Int. Cl.
*A47J 37/12* (2006.01)
*A23P 1/00* (2006.01)

(52) U.S. Cl.
USPC ............ 99/413; 426/510; 426/113; 426/119; 426/120; 426/413; 99/410; 99/417; 220/573.4; 220/573.5; 220/23.87; 220/23.88

(58) Field of Classification Search
USPC ............... 426/107, 113, 119, 120, 234, 412; 99/410, 411, 412, 413, 414, 417, 495; 220/573.4, 573.5, 23.87, 23.88; 206/541, 546, 542; 210/464, 469, 473, 210/474, 475
See application file for complete search history.

(56) References Cited

U.S. PATENT DOCUMENTS

| 113,893 A | * | 4/1871 | Joyce et al. ................... 220/762 |
| 166,102 A | * | 7/1875 | Hennaman .................... 220/525 |
| 177,593 A | | 5/1876 | Van Skelline |
| 181,823 A | * | 9/1876 | Cornwall ........................ 99/425 |
| 241,254 A | | 5/1881 | Udell |
| 541,397 A | * | 6/1895 | Swartout .................... 220/573.5 |
| 590,212 A | * | 9/1897 | Daesch .......................... 99/416 |
| 637,838 A | | 11/1899 | Vernon |
| 851,983 A | * | 4/1907 | Entringer ...................... 210/314 |
| 899,244 A | * | 9/1908 | Chase ............................. 99/412 |
| 902,181 A | * | 10/1908 | Tidow ............................ 99/408 |
| 948,198 A | * | 2/1910 | Wiegand ........................ 99/417 |
| 952,572 A | * | 3/1910 | Meyer ............................ 99/413 |
| 1,004,423 A | * | 9/1911 | Hanlon ......................... 220/759 |
| 1,099,603 A | | 6/1914 | Ingersoll |
| 1,263,004 A | * | 4/1918 | Tollagsen ..................... 126/369 |
| 1,341,960 A | * | 6/1920 | Meyer et al. ............. 220/592.23 |
| 1,347,428 A | * | 7/1920 | Wittekind .................. 220/573.4 |
| 1,476,910 A | | 12/1923 | Naugle |
| 1,519,510 A | * | 12/1924 | Santarsiero ..................... 99/416 |

(Continued)

FOREIGN PATENT DOCUMENTS

CH 672 585 * 12/1989 ............. A47J 27/04
DE 28 10 175 A1 9/1979

(Continued)

OTHER PUBLICATIONS

Machine translation FR 2774262, Etimble et al., Aug. 1999.*

(Continued)

*Primary Examiner* — Rena Dye
*Assistant Examiner* — Chaim Smith
(74) *Attorney, Agent, or Firm* — Advent, LLP; Ryan T. Grace

(57) ABSTRACT

A cooking apparatus facilitates cooking with a heated/boiling liquid of a food item by utilizing a cooking bag, a cooking tray, and/or a cooking film. A food product that utilizes the cooking apparatus and food items produces cooked food that may be plateable.

24 Claims, 16 Drawing Sheets

(56) References Cited

U.S. PATENT DOCUMENTS

| | | | | |
|---|---|---|---|---|
| 1,630,787 A | * | 5/1927 | Cullen | 99/416 |
| 1,765,862 A | | 6/1930 | Clapp | |
| 1,864,081 A | | 6/1932 | Marr | |
| 1,906,592 A | | 5/1933 | Hiester | |
| 1,944,089 A | | 1/1934 | Litchfield | 150/9 |
| 1,958,978 A | * | 5/1934 | Thomas, Jean | 426/113 |
| 2,021,465 A | * | 11/1935 | Ritscher | 99/403 |
| 2,039,374 A | | 5/1936 | Young | |
| 2,041,227 A | | 5/1936 | Chalmers | 229/87 |
| 2,107,480 A | * | 2/1938 | Holton | 126/377.1 |
| 2,149,872 A | | 3/1939 | Schmidt | 229/58 |
| 2,200,977 A | | 5/1940 | Baxter | 426/95 |
| 2,271,921 A | | 2/1942 | Luker | |
| 2,290,396 A | | 7/1942 | Webster | |
| 2,540,036 A | | 1/1951 | Spencer | |
| 2,556,115 A | * | 6/1951 | Smith | 99/417 |
| 2,559,101 A | | 7/1951 | Wool | |
| 2,576,862 A | | 11/1951 | Smith et al. | |
| 2,591,578 A | | 4/1952 | McNealy et al. | |
| 2,600,566 A | | 6/1952 | Moffett | |
| 2,650,485 A | | 9/1953 | La Greca | 220/23.83 |
| 2,660,529 A | | 11/1953 | Bloom | |
| 2,667,422 A | | 1/1954 | Kauffman | 426/86 |
| 2,673,805 A | | 3/1954 | Colman | 99/171 |
| 2,673,806 A | | 3/1954 | Colman | 99/171 |
| 2,714,070 A | | 7/1955 | Welch | |
| 2,741,559 A | | 4/1956 | Banowitz | 99/171 |
| 2,777,769 A | * | 1/1957 | Hodges | 426/113 |
| 2,801,930 A | | 8/1957 | Paulucci | 99/193 |
| 2,805,392 A | * | 9/1957 | Schnoll | 324/706 |
| 2,852,898 A | | 9/1958 | Berg | 53/182 |
| 2,858,970 A | | 11/1958 | Barnes et al. | 229/55 |
| 2,865,768 A | | 12/1958 | Barnes et al. | 99/171 |
| D185,399 S | | 6/1959 | Tupper | |
| 2,960,218 A | | 11/1960 | Cheeley | |
| 2,961,520 A | | 11/1960 | Long | |
| 2,965,501 A | | 12/1960 | Harriss | 426/120 |
| 3,012,895 A | * | 12/1961 | Stelnicki | 426/113 |
| 3,027,261 A | | 3/1962 | Samara | 99/171 |
| 3,035,754 A | | 5/1962 | Meister | 229/53 |
| 3,052,554 A | | 9/1962 | Colman | 99/171 |
| 3,068,779 A | * | 12/1962 | Eidlisz | 99/416 |
| 3,070,275 A | | 12/1962 | Bostrom | 229/4.5 |
| 3,107,989 A | | 10/1963 | Fesco | 55/381 |
| 3,109,359 A | * | 11/1963 | Falla | 99/339 |
| 3,141,400 A | | 7/1964 | Powers | |
| 3,179,036 A | | 4/1965 | Luker | |
| 3,191,520 A | | 6/1965 | Halter | |
| 3,219,460 A | | 11/1965 | Brown | |
| 3,220,635 A | | 11/1965 | Kasting et al. | 229/57 |
| 3,220,856 A | | 11/1965 | Vischer | |
| 3,240,610 A | | 3/1966 | Cease | |
| 3,244,537 A | | 4/1966 | Cease | |
| 3,246,446 A | | 4/1966 | Powers | |
| 3,262,668 A | | 7/1966 | Luker | |
| 3,271,169 A | | 9/1966 | Baker et al. | |
| 3,286,832 A | | 11/1966 | Pilger | 206/56 |
| 3,287,140 A | | 11/1966 | Brussell | |
| 3,293,048 A | | 12/1966 | Kitterman | 99/171 |
| 3,326,097 A | | 6/1967 | Lokey | 93/82 |
| 3,349,941 A | | 10/1967 | Wanderer | 220/23.88 |
| 3,353,327 A | | 11/1967 | Cutler et al. | 53/28 |
| 3,353,707 A | | 11/1967 | Eyles | 206/519 |
| 3,357,152 A | | 12/1967 | Geigel | 53/29 |
| 3,396,868 A | | 8/1968 | Fitzgerald | 206/508 |
| 3,420,397 A | | 1/1969 | Miller | 220/203.09 |
| 3,421,654 A | | 1/1969 | Hexel | |
| 3,424,342 A | | 1/1969 | Scopp et al. | 220/793 |
| 3,445,050 A | | 5/1969 | Peters et al. | |
| 3,447,714 A | | 6/1969 | Elliot | 206/1.5 |
| 3,489,075 A | * | 1/1970 | O'Reilly | 99/450 |
| 3,521,788 A | | 7/1970 | Carter et al. | 220/675 |
| 3,547,661 A | | 12/1970 | Stevenson | |
| 3,608,770 A | | 9/1971 | Naimoli | 220/16 |
| 3,610,135 A | | 10/1971 | Sheridan | |
| 3,610,458 A | | 10/1971 | Nissley | |
| 3,615,646 A | | 10/1971 | Neely et al. | |
| 3,620,834 A | | 11/1971 | Duffy | 117/213 |
| 3,637,132 A | | 1/1972 | Gray | 229/53 |
| 3,638,784 A | | 2/1972 | Bodolay et al. | 206/45.34 |
| 3,641,926 A | * | 2/1972 | Williams et al. | 99/448 |
| 3,647,508 A | | 3/1972 | Gorrell | 117/38 |
| 3,669,688 A | | 6/1972 | Thompson | |
| 3,718,480 A | | 2/1973 | Tremblay et al. | |
| 3,741,427 A | * | 6/1973 | Doyle | 220/573.4 |
| 3,777,447 A | | 12/1973 | Herbine et al. | 53/36 |
| 3,811,374 A | | 5/1974 | Mann | |
| 3,835,280 A | | 9/1974 | Gades et al. | 219/10.55 |
| 3,836,042 A | | 9/1974 | Petitto | |
| 3,844,409 A | | 10/1974 | Bodolay et al. | 206/45.34 |
| 3,851,574 A | | 12/1974 | Katz et al. | 426/107 |
| 3,865,301 A | | 2/1975 | Pothier et al. | |
| 3,873,735 A | | 3/1975 | Chalin et al. | 426/87 |
| 3,881,027 A | | 4/1975 | Levinson | |
| 3,884,213 A | | 5/1975 | Smith | |
| 3,884,383 A | | 5/1975 | Burch et al. | 220/675 |
| 3,893,567 A | | 7/1975 | Davis et al. | 206/520 |
| 3,908,029 A | | 9/1975 | Fredrickson | |
| 3,938,730 A | | 2/1976 | Detzel et al. | 229/120.01 |
| 3,941,967 A | | 3/1976 | Sumi et al. | |
| 3,956,866 A | | 5/1976 | Lattur | 53/29 |
| 3,965,323 A | | 6/1976 | Forker, Jr. et al. | |
| 3,970,241 A | | 7/1976 | Hanson | 229/58 |
| 3,973,045 A | | 8/1976 | Brandberg et al. | 426/110 |
| 3,974,353 A | | 8/1976 | Goltsos | |
| 3,975,552 A | | 8/1976 | Stangroom | |
| 3,983,256 A | | 9/1976 | Norris et al. | |
| 3,985,990 A | | 10/1976 | Levinson | |
| 4,018,355 A | | 4/1977 | Ando | 220/522 |
| 4,031,261 A | | 6/1977 | Durst | |
| 4,036,423 A | | 7/1977 | Gordon | 229/43 |
| 4,038,425 A | | 7/1977 | Brandberg et al. | 426/107 |
| 4,043,098 A | | 8/1977 | Putnam, Jr. et al. | 53/180 M |
| 4,065,583 A | | 12/1977 | Ahlgren | |
| 4,077,853 A | | 3/1978 | Coll-Palagos | 204/20 |
| 4,079,853 A | | 3/1978 | Casutt | |
| 4,082,184 A | | 4/1978 | Hammer | 206/519 |
| 4,082,691 A | | 4/1978 | Berger | |
| 4,096,948 A | | 6/1978 | Kuchenbecker | |
| 4,113,095 A | | 9/1978 | Dietz et al. | 206/508 |
| 4,118,913 A | | 10/1978 | Putnam, Jr. et al. | 53/551 |
| 4,126,945 A | | 11/1978 | Manser et al. | |
| 4,132,811 A | | 1/1979 | Standing et al. | 426/111 |
| 4,133,896 A | | 1/1979 | Standing et al. | |
| 4,136,505 A | | 1/1979 | Putnam, Jr. et al. | 53/551 |
| 4,140,889 A | * | 2/1979 | Mason et al. | 219/733 |
| 4,154,860 A | | 5/1979 | Daswick | |
| 4,156,806 A | | 5/1979 | Teich et al. | 219/10.55 E |
| 4,164,174 A | * | 8/1979 | Wallsten | 99/415 |
| 4,171,605 A | | 10/1979 | Putnam, Jr. et al. | 53/552 |
| 4,184,061 A | | 1/1980 | Suzuki et al. | 219/10.55 E |
| 4,186,217 A | | 1/1980 | Tchack | 426/523 |
| 4,190,757 A | | 2/1980 | Turpin et al. | 219/10.55 E |
| 4,196,331 A | | 4/1980 | Leveckis et al. | 219/10.55 E |
| 4,219,573 A | | 8/1980 | Borek | 426/107 |
| 4,228,945 A | | 10/1980 | Wysocki | |
| 4,230,767 A | | 10/1980 | Isaka et al. | 428/349 |
| 4,230,924 A | | 10/1980 | Brastad et al. | 219/10.55 E |
| 4,233,325 A | | 11/1980 | Slangan et al. | |
| 4,241,563 A | | 12/1980 | Müller et al. | 53/511 |
| 4,242,378 A | | 12/1980 | Arai | 427/264 |
| 4,258,086 A | | 3/1981 | Beall | 219/10.43 |
| 4,264,668 A | | 4/1981 | Balla | 428/195 |
| 4,267,420 A | | 5/1981 | Brastad | 219/10.55 E |
| 4,279,933 A | | 7/1981 | Austin et al. | 426/124 |
| 4,280,032 A | | 7/1981 | Levinson | |
| 4,283,427 A | | 8/1981 | Winters et al. | 426/107 |
| 4,291,520 A | | 9/1981 | Prince et al. | 53/551 |
| 4,292,332 A | | 9/1981 | McHam | 426/111 |
| 4,306,133 A | | 12/1981 | Levinson | |
| 4,316,070 A | | 2/1982 | Prosise et al. | 219/10.55 E |
| 4,317,017 A | | 2/1982 | Bowen | |
| 4,324,088 A | | 4/1982 | Yamashita et al. | 53/527 |
| 4,328,254 A | | 5/1982 | Waldburger | |

(56) References Cited

U.S. PATENT DOCUMENTS

| | | | |
|---|---|---|---|
| 4,335,291 A | 6/1982 | Ishino et al. | 219/10.55 E |
| 4,340,138 A | 7/1982 | Bernhardt | 206/216 |
| 4,345,133 A | 8/1982 | Cherney et al. | 219/10.55 E |
| 4,348,421 A * | 9/1982 | Sakakibara et al. | 426/394 |
| 4,351,997 A | 9/1982 | Mattisson et al. | |
| 4,355,757 A | 10/1982 | Roccaforte | 229/33 |
| 4,373,511 A | 2/1983 | Miles et al. | 126/369 |
| 4,377,493 A | 3/1983 | Boylan et al. | |
| 4,389,438 A | 6/1983 | Ohtsuki et al. | 428/35 |
| 4,390,555 A | 6/1983 | Levison | |
| 4,398,994 A | 8/1983 | Beckett | 156/659.1 |
| 4,416,906 A | 11/1983 | Watkins | |
| 4,425,368 A | 1/1984 | Watkins | |
| 4,439,656 A | 3/1984 | Peleg | 219/10.55 E |
| 4,453,665 A | 6/1984 | Roccaforte et al. | 229/41 B |
| 4,461,031 A | 7/1984 | Blamer | 383/123 |
| 4,477,705 A | 10/1984 | Danley et al. | |
| 4,478,349 A * | 10/1984 | Haverland et al. | 220/573.4 |
| 4,481,392 A | 11/1984 | Nibbe et al. | |
| 4,486,640 A | 12/1984 | Bowen et al. | 219/729 |
| 4,493,685 A | 1/1985 | Blamer | 493/235 |
| 4,496,815 A | 1/1985 | Jorgensen | |
| 4,517,045 A | 5/1985 | Beckett | 156/345 |
| 4,518,651 A | 5/1985 | Wolfe, Jr. | 428/308.8 |
| 4,529,089 A | 7/1985 | Gasbarra et al. | 206/525 |
| 4,532,397 A | 7/1985 | McClelland | |
| D280,058 S | 8/1985 | Carlson | D7/629 |
| 4,535,889 A | 8/1985 | Terauds | 206/527 |
| 4,552,614 A | 11/1985 | Beckett | 156/640 |
| 4,553,010 A | 11/1985 | Bohrer et al. | 219/10.55 E |
| 4,571,337 A | 2/1986 | Cage et al. | 426/107 |
| 4,581,989 A | 4/1986 | Swartley | 99/346 |
| 4,584,202 A | 4/1986 | Roccaforte | 426/111 |
| 4,586,649 A | 5/1986 | Webinger | 229/114 |
| 4,610,755 A | 9/1986 | Beckett | 156/634 |
| 4,612,431 A | 9/1986 | Brown et al. | 219/10.55 E |
| 4,626,352 A * | 12/1986 | Massey et al. | 210/469 |
| 4,640,838 A | 2/1987 | Isakson et al. | 426/107 |
| 4,641,005 A | 2/1987 | Seiferth | 219/10.55 E |
| 4,657,141 A | 4/1987 | Sorensen | 206/519 |
| 4,661,326 A | 4/1987 | Schainholz | 422/310 |
| 4,661,671 A | 4/1987 | Maroszek | 219/10.55 E |
| 4,661,672 A | 4/1987 | Nakanaga | |
| 4,677,905 A * | 7/1987 | Johnson | 99/413 |
| 4,678,882 A | 7/1987 | Bohrer et al. | 219/10.55 E |
| 4,685,997 A | 8/1987 | Beckett | 156/629 |
| 4,697,703 A | 10/1987 | Will | 206/438 |
| 4,701,585 A | 10/1987 | Stewart | 219/10.55 E |
| 4,703,148 A | 10/1987 | Mikulski et al. | |
| 4,703,149 A | 10/1987 | Sugisawa et al. | |
| 4,705,927 A | 11/1987 | Levendusky et al. | 219/10.55 E |
| 4,713,510 A | 12/1987 | Quick et al. | 219/10.55 E |
| 4,714,012 A * | 12/1987 | Hernandez | 99/444 |
| 4,727,706 A | 3/1988 | Beer | 53/434 |
| 4,734,288 A | 3/1988 | Engstrom et al. | 426/107 |
| 4,738,882 A | 4/1988 | Rayford et al. | 428/35 |
| 4,739,698 A * | 4/1988 | Allaire | 99/410 |
| 4,739,898 A | 4/1988 | Brown | 220/203.21 |
| 4,745,249 A | 5/1988 | Daniels | |
| 4,777,053 A | 10/1988 | Tobelmann et al. | |
| 4,794,005 A | 12/1988 | Swiontek | |
| 4,797,010 A | 1/1989 | Coelho | 383/109 |
| 4,803,088 A | 2/1989 | Yamamoto et al. | 426/107 |
| 4,804,582 A | 2/1989 | Noding et al. | 428/332 |
| 4,806,718 A | 2/1989 | Seaborne et al. | 219/10.55 E |
| 4,808,780 A | 2/1989 | Seaborne | 219/10.55 E |
| 4,810,845 A | 3/1989 | Seaborne | 219/10.55 E |
| 4,818,831 A | 4/1989 | Seaborne | 219/10.55 E |
| 4,825,025 A | 4/1989 | Seiferth | 219/10.55 E |
| 4,842,876 A | 6/1989 | Anderson et al. | |
| 4,846,350 A | 7/1989 | Sorensen | 206/520 |
| 4,848,579 A | 7/1989 | Barnes et al. | |
| 4,851,246 A | 7/1989 | Maxwell et al. | 426/107 |
| 4,853,505 A | 8/1989 | Sorenson | |
| 4,853,509 A | 8/1989 | Murakami | |
| 4,864,089 A | 9/1989 | Tighe et al. | 219/10.55 E |
| 4,864,090 A | 9/1989 | Maxwell et al. | 219/10.55 E |
| 4,870,233 A | 9/1989 | McDonald et al. | |
| 4,873,919 A | 10/1989 | Janssen | |
| 4,883,936 A | 11/1989 | Maynard et al. | 219/10.55 E |
| 4,892,744 A | 1/1990 | Ylvisaker | 426/111 |
| 4,896,009 A | 1/1990 | Pawlowski | 219/10.55 E |
| 4,899,925 A | 2/1990 | Bowden et al. | 229/2.5 R |
| 4,904,488 A | 2/1990 | LaBaw et al. | 426/107 |
| 4,914,266 A | 4/1990 | Parks et al. | 219/10.55 E |
| 4,915,216 A | 4/1990 | Magers | 206/520 |
| 4,915,780 A | 4/1990 | Beckett | 156/661.1 |
| 4,923,704 A | 5/1990 | Levinson | |
| 4,924,048 A | 5/1990 | Bunce et al. | |
| 4,935,592 A | 6/1990 | Oppenheimer | |
| 4,939,332 A | 7/1990 | Hahn | |
| 4,943,456 A | 7/1990 | Pollart et al. | 428/34.3 |
| 4,948,932 A | 8/1990 | Clough | 219/10.55 E |
| 4,952,765 A | 8/1990 | Toyosawa | |
| 4,959,516 A | 9/1990 | Tighe et al. | 219/10.55 E |
| 4,960,598 A | 10/1990 | Swiontek | |
| 4,961,944 A | 10/1990 | Matoba et al. | |
| 4,963,708 A | 10/1990 | Kearns et al. | |
| D312,189 S | 11/1990 | Noel | |
| 4,973,810 A | 11/1990 | Brauner | 219/10.55 E |
| 4,982,064 A | 1/1991 | Hartman et al. | 219/10.55 E |
| 4,987,280 A | 1/1991 | Kanafani et al. | |
| 4,990,349 A | 2/1991 | Chawan et al. | |
| 4,992,638 A | 2/1991 | Hewitt et al. | |
| 5,011,299 A | 4/1991 | Black, Jr. et al. | 383/126 |
| 5,025,715 A | 6/1991 | Sir | |
| 5,026,958 A | 6/1991 | Palacios | |
| 5,035,800 A * | 7/1991 | Kopach | 210/469 |
| 5,038,009 A | 8/1991 | Babbitt | 219/10.55 E |
| 5,039,001 A | 8/1991 | Kinigakis et al. | 229/120 |
| 5,041,295 A | 8/1991 | Perry et al. | |
| 5,044,777 A | 9/1991 | Watkins et al. | 383/100 |
| 5,050,791 A | 9/1991 | Bowden et al. | 229/2.5 R |
| 5,052,369 A | 10/1991 | Johnson | |
| 5,057,331 A | 10/1991 | Levinson | 426/243 |
| D321,302 S | 11/1991 | Zimmerman | |
| 5,063,072 A | 11/1991 | Gillmore et al. | |
| 5,075,526 A | 12/1991 | Sklenak et al. | |
| 5,077,066 A | 12/1991 | Mattson et al. | |
| 5,081,330 A | 1/1992 | Brandberg et al. | 219/10.55 E |
| 5,094,865 A | 3/1992 | Levinson | |
| 5,095,186 A | 3/1992 | Scott Russell et al. | 219/10.55 E |
| 5,106,635 A | 4/1992 | McCutchan et al. | |
| 5,107,087 A | 4/1992 | Yamada et al. | |
| 5,108,768 A | 4/1992 | So | 426/77 |
| 5,153,402 A | 10/1992 | Quick et al. | 219/10.55 E |
| 5,176,284 A | 1/1993 | Sorensen | 220/659 |
| 5,189,947 A | 3/1993 | Yim | 426/109 |
| 5,190,777 A | 3/1993 | Anderson et al. | |
| 5,195,829 A | 3/1993 | Watkins et al. | 383/100 |
| 5,200,590 A | 4/1993 | Bowen et al. | 219/10.55 E |
| D335,445 S | 5/1993 | Detert et al. | D9/761 |
| D335,821 S | 5/1993 | Detert et al. | D9/761 |
| D336,242 S | 6/1993 | Detert et al. | D9/761 |
| 5,223,291 A | 6/1993 | Levinson et al. | |
| 5,230,914 A | 7/1993 | Akervik | |
| 5,241,149 A | 8/1993 | Watanabe et al. | |
| D341,990 S | 12/1993 | Yim | |
| 5,294,765 A | 3/1994 | Archibald et al. | 219/727 |
| 5,298,708 A | 3/1994 | Babu et al. | 219/728 |
| 5,300,747 A | 4/1994 | Simon | |
| 5,315,083 A | 5/1994 | Green | |
| 5,363,750 A | 11/1994 | Miller et al. | 99/426 |
| D353,303 S | 12/1994 | Davis | |
| 5,370,042 A | 12/1994 | Tolchin et al. | |
| 5,419,451 A | 5/1995 | Bitel, Jr. | 220/306 |
| 5,423,453 A | 6/1995 | Fritz | |
| 5,520,301 A | 5/1996 | Sohn | 220/265 |
| D370,598 S | 6/1996 | Koch | |
| D371,963 S | 7/1996 | Ahern, Jr. | |
| 5,540,381 A | 7/1996 | Davis | 229/103.2 |
| 5,558,798 A | 9/1996 | Tsai | |
| D376,512 S | 12/1996 | Klemme | D7/538 |
| 5,588,587 A | 12/1996 | Stier et al. | |

(56) References Cited

U.S. PATENT DOCUMENTS

| | | | |
|---|---|---|---|
| D378,566 S | 3/1997 | Cousins | D7/667 |
| 5,645,300 A | 7/1997 | Hill | |
| 5,645,762 A | 7/1997 | Cook et al. | |
| 5,650,084 A | 7/1997 | Bley | 219/727 |
| D384,555 S | 10/1997 | Bradley | |
| 5,674,546 A | 10/1997 | Barnes et al. | |
| D386,042 S | 11/1997 | Miller | |
| 5,690,853 A | 11/1997 | Jackson et al. | 219/727 |
| 5,695,801 A | 12/1997 | Oh | |
| 5,698,306 A | 12/1997 | Prosise et al. | |
| 5,704,485 A | 1/1998 | Cautereels et al. | 206/546 |
| 5,718,933 A | 2/1998 | Fultz | 426/115 |
| 5,726,426 A | 3/1998 | Davis et al. | |
| 5,741,534 A | 4/1998 | Chung | |
| 5,747,086 A | 5/1998 | Bows et al. | |
| 5,753,895 A | 5/1998 | Olson et al. | 219/727 |
| 5,770,840 A | 6/1998 | Lorence | |
| 5,807,597 A | 9/1998 | Barnes et al. | |
| D405,561 S | 2/1999 | Willinger et al. | D30/129 |
| 5,866,041 A | 2/1999 | Svarz et al. | |
| 5,869,120 A | 2/1999 | Blazevich | 426/132 |
| 5,871,790 A | 2/1999 | Monier et al. | 426/107 |
| 5,876,811 A | 3/1999 | Blackwell et al. | |
| 5,900,264 A | 5/1999 | Gics | |
| 5,913,966 A * | 6/1999 | Arnone et al. | 99/413 |
| 5,916,470 A | 6/1999 | Besser et al. | |
| 5,916,620 A | 6/1999 | Oh | |
| 5,925,281 A | 7/1999 | Levinson | |
| 5,928,554 A | 7/1999 | Olson et al. | 219/727 |
| 5,931,333 A | 8/1999 | Woodnorth et al. | 220/573.4 |
| 5,961,872 A | 10/1999 | Simon et al. | |
| 5,970,858 A * | 10/1999 | Boehm et al. | 99/446 |
| 5,974,953 A * | 11/1999 | Messerli | 99/340 |
| 5,986,248 A | 11/1999 | Matsuno et al. | 219/728 |
| 5,988,045 A | 11/1999 | Housley | |
| 5,988,050 A * | 11/1999 | Foster, Jr. | 99/467 |
| D418,017 S | 12/1999 | Henry | |
| D419,371 S | 1/2000 | Haley | D7/392.1 |
| 6,018,157 A | 1/2000 | Craft | |
| 6,042,856 A | 3/2000 | Sagan et al. | 426/87 |
| D422,176 S | 4/2000 | Laib | D7/392.1 |
| 6,049,072 A | 4/2000 | Olson et al. | 219/727 |
| 6,097,017 A | 8/2000 | Pickford | |
| 6,103,291 A * | 8/2000 | Fernandez Tapia | 426/523 |
| 6,106,882 A | 8/2000 | Oh et al. | |
| D432,414 S | 10/2000 | Simpson et al. | D9/711 |
| D432,914 S | 10/2000 | Hayes et al. | |
| 6,126,976 A | 10/2000 | Hasse, Jr. et al. | |
| 6,136,355 A | 10/2000 | Fukuyama | |
| D433,884 S | 11/2000 | Fujimoto | D7/667 |
| 6,147,337 A | 11/2000 | Besser | |
| 6,150,646 A | 11/2000 | Lai et al. | |
| 6,168,044 B1 | 1/2001 | Zettle et al. | 220/784 |
| 6,175,105 B1 | 1/2001 | Rubbright et al. | |
| 6,180,148 B1 | 1/2001 | Yajima | |
| 6,180,150 B1 | 1/2001 | Schäfer | |
| 6,183,789 B1 | 2/2001 | Nilsson et al. | |
| 6,187,354 B1 | 2/2001 | Hopkins | 426/234 |
| 6,192,792 B1 | 2/2001 | Gremillion | |
| 6,196,406 B1 | 3/2001 | Ennis | |
| 6,217,918 B1 | 4/2001 | Oh et al. | |
| D441,597 S | 5/2001 | Wyche | |
| D442,425 S | 5/2001 | Wyche | |
| 6,229,131 B1 | 5/2001 | Koochaki | |
| D445,633 S | 7/2001 | Bradley | |
| D449,102 S | 10/2001 | Shin | D23/366 |
| D449,495 S | 10/2001 | Tucker et al. | |
| 6,309,684 B2 | 10/2001 | Hopkins, Sr. | 426/234 |
| 6,394,337 B1 | 5/2002 | Ross et al. | 229/103.2 |
| 6,396,036 B1 | 5/2002 | Hanson | 219/727 |
| 6,422,453 B1 | 7/2002 | Wang | |
| 6,455,084 B2 | 9/2002 | Johns | |
| 6,463,844 B1 | 10/2002 | Wang et al. | |
| 6,467,399 B1 | 10/2002 | Boutte | |
| 6,486,455 B1 | 11/2002 | Merabet | |
| D466,762 S | 12/2002 | Cote et al. | D7/545 |
| 6,509,047 B2 | 1/2003 | Edomwonyi | |
| D470,768 S | 2/2003 | Melhede | D9/428 |
| 6,559,431 B2 | 5/2003 | Hopkins | 219/735 |
| 6,565,910 B1 * | 5/2003 | Schell et al. | 426/589 |
| D477,187 S | 7/2003 | McCallister et al. | |
| 6,608,292 B1 | 8/2003 | Barnes | |
| 6,612,482 B2 | 9/2003 | Ross | 229/103.2 |
| 6,645,539 B2 | 11/2003 | Bukowski et al. | |
| D483,616 S | 12/2003 | Thonis | |
| D485,473 S | 1/2004 | Dais et al. | D7/629 |
| 6,727,484 B2 | 4/2004 | Policappelli | |
| 6,803,551 B2 | 10/2004 | Kim et al. | 219/731 |
| D497,744 S | 11/2004 | Portugal | D7/543 |
| 6,818,873 B2 | 11/2004 | Savage et al. | |
| 6,840,159 B1 * | 1/2005 | Li | 99/337 |
| D502,847 S | 3/2005 | Leonori | D7/667 |
| 6,868,980 B2 | 3/2005 | Schultz et al. | 220/367.1 |
| D505,048 S * | 5/2005 | Cornfield | D7/409 |
| D508,822 S | 8/2005 | Smith et al. | |
| 7,008,214 B2 * | 3/2006 | Faddi | 425/382 R |
| 7,022,359 B2 | 4/2006 | Montserrate Gibernau | |
| 7,025,213 B2 | 4/2006 | Chen | 210/474 |
| D521,380 S | 5/2006 | Jackson et al. | |
| 7,038,181 B2 | 5/2006 | Edmark | |
| 7,045,190 B2 | 5/2006 | Inagaki et al. | |
| D526,840 S | 8/2006 | Carlson | D7/392.1 |
| 7,090,090 B2 | 8/2006 | Ohyama | |
| D529,797 S | 10/2006 | Wilcox et al. | D9/428 |
| D543,796 S | 6/2007 | Lion et al. | D7/667 |
| D552,433 S | 10/2007 | Stewart | D7/667 |
| D558,536 S | 1/2008 | Curtin | D7/667 |
| D558,602 S | 1/2008 | Kissner et al. | D9/711 |
| D563,157 S | 3/2008 | Bouveret et al. | |
| D564,287 S | 3/2008 | Bouveret et al. | |
| D564,307 S | 3/2008 | Repp | D7/667 |
| D571,656 S | 6/2008 | Maslowski | D9/425 |
| D577,295 S | 9/2008 | Miller et al. | D9/711 |
| D582,201 S | 12/2008 | Kellermann | |
| D582,791 S | 12/2008 | Elmerhaus | D9/721 |
| 7,468,498 B2 | 12/2008 | Tuszkiewicz et al. | 219/725 |
| D584,111 S | 1/2009 | Eide et al. | D7/667 |
| D584,145 S | 1/2009 | Young | |
| D590,663 S | 4/2009 | Simon et al. | |
| D591,591 S | 5/2009 | Moecks et al. | |
| D592,948 S | 5/2009 | Mayer | D9/418 |
| D593,369 S | 6/2009 | Green et al. | D7/602 |
| D594,328 S | 6/2009 | Shapiro et al. | D9/435 |
| D598,717 S | 8/2009 | Jalet | D7/667 |
| D607,095 S | 12/2009 | LeMay et al. | D23/366 |
| D610,903 S | 3/2010 | Shapiro et al. | D9/428 |
| D612,196 S | 3/2010 | Furlong | D7/392.1 |
| D613,131 S | 4/2010 | Chen et al. | D7/667 |
| D630,061 S | 1/2011 | Kellermann | |
| D630,507 S | 1/2011 | Short et al. | D9/427 |
| D630,940 S | 1/2011 | Shapiro et al. | D9/428 |
| D632,561 S | 2/2011 | Short et al. | D9/427 |
| D633,810 S | 3/2011 | Jenkins | D9/721 |
| 7,977,612 B2 | 7/2011 | Levy et al. | 219/729 |
| 2001/0035402 A1 * | 11/2001 | Barrow | 219/432 |
| 2001/0043971 A1 | 11/2001 | Johns | |
| 2002/0096450 A1 | 7/2002 | Garst | 206/516 |
| 2002/0110622 A1 | 8/2002 | Lloyd et al. | 426/115 |
| 2003/0003200 A1 | 1/2003 | Bukowski et al. | |
| 2003/0068411 A1 | 4/2003 | McCallister | 426/107 |
| 2003/0213718 A1 | 11/2003 | Ducharme et al. | 206/503 |
| 2004/0058038 A1 * | 3/2004 | Lee | 426/107 |
| 2004/0107637 A1 | 6/2004 | Sieverding | 47/83 |
| 2004/0121049 A1 | 6/2004 | Ebner et al. | |
| 2004/0164075 A1 | 8/2004 | Henze et al. | 219/740 |
| 2004/0238438 A1 | 12/2004 | Chen | 210/474 |
| 2005/0040161 A1 | 2/2005 | Lin et al. | 219/725 |
| 2005/0051549 A1 | 3/2005 | Nelson | 220/23.83 |
| 2005/0069602 A1 * | 3/2005 | Faddi | 425/208 |
| 2005/0079250 A1 * | 4/2005 | Mao et al. | 426/113 |
| 2005/0079252 A1 | 4/2005 | Kendig et al. | 426/125 |
| 2005/0082305 A1 | 4/2005 | Dais et al. | |
| 2005/0109772 A1 | 5/2005 | Thorpe et al. | |
| 2005/0112243 A1 | 5/2005 | Bellmann | 426/106 |

(56) References Cited

U.S. PATENT DOCUMENTS

| | | | |
|---|---|---|---|
| 2005/0115417 A1* | 6/2005 | Murat et al. | 99/413 |
| 2005/0208182 A1* | 9/2005 | Gilbert et al. | 426/87 |
| 2005/0220939 A1 | 10/2005 | Morrow | 426/86 |
| 2005/0229793 A1 | 10/2005 | Wengrovsky | 99/483 |
| 2005/0256060 A1 | 11/2005 | Hilgers et al. | 514/25 |
| 2005/0271776 A1* | 12/2005 | Siegel | 426/138 |
| 2005/0281921 A1 | 12/2005 | Langston et al. | 426/120 |
| 2006/0013929 A1 | 1/2006 | Morris et al. | |
| 2006/0088678 A1 | 4/2006 | Berrier et al. | |
| 2006/0110498 A1 | 5/2006 | Dellinger et al. | |
| 2006/0118552 A1 | 6/2006 | Tiefenback | |
| 2006/0121168 A1 | 6/2006 | Flaherty et al. | |
| 2006/0151339 A1 | 7/2006 | Bradley et al. | |
| 2006/0236593 A1 | 10/2006 | Cap | |
| 2006/0260598 A1 | 11/2006 | Bjork et al. | |
| 2006/0289522 A1 | 12/2006 | Middleton et al. | 219/730 |
| 2007/0029314 A1 | 2/2007 | Rodgers et al. | 219/730 |
| 2007/0059406 A1 | 3/2007 | Shahsavarani | 426/106 |
| 2007/0090103 A1 | 4/2007 | France et al. | |
| 2007/0116806 A1 | 5/2007 | Parsons | 426/107 |
| 2007/0116807 A1 | 5/2007 | Parsons | 426/107 |
| 2007/0131679 A1 | 6/2007 | Edwards et al. | 219/725 |
| 2007/0181008 A1 | 8/2007 | Pawlick et al. | 99/450 |
| 2007/0251874 A1 | 11/2007 | Stewart | 210/232 |
| 2008/0069485 A1 | 3/2008 | France et al. | |
| 2008/0138473 A1 | 6/2008 | Pawlick et al. | |
| 2008/0178744 A1 | 7/2008 | Hill | 99/323.5 |
| 2008/0210686 A1 | 9/2008 | Shapiro et al. | |
| 2009/0022858 A1 | 1/2009 | Pawlick | |
| 2009/0078125 A1 | 3/2009 | Pawlick et al. | 99/448 |
| 2009/0142455 A1 | 6/2009 | Parsons | 426/120 |
| 2010/0015293 A1 | 1/2010 | Shapiro | |

FOREIGN PATENT DOCUMENTS

| | | | |
|---|---|---|---|
| EP | 0 326 105 * | 8/1989 | A47J 27/05 |
| EP | 0449643 * | 10/1991 | B65D 81/34 |
| EP | 1 352 841 A1 | 4/2002 | B65D 21/04 |
| EP | 1 245 504 A1 | 10/2002 | B65D 81/34 |
| EP | 1 352 848 A1 | 10/2003 | B65D 81/34 |
| EP | 1 514 804 A1 | 3/2005 | |
| EP | 1 464 262 B1 | 7/2005 | |
| EP | 1 612 150 A1 | 1/2006 | |
| EP | 1 749 757 A2 | 2/2007 | |
| FR | 2 631 315 A3 | 11/1989 | |
| FR | 2774262 * | 8/1999 | A23L 1/168 |
| FR | 2 846 196 A1 | 4/2004 | |
| FR | 2 860 213 | 4/2005 | |
| FR | 2 929 491 | 10/2009 | |
| GB | 1560488 | 2/1980 | B65D 25/02 |
| GB | 2 218 962 A | 11/1989 | |
| GB | 2 295 371 A | 5/1996 | |
| GB | 2 308 465 A | 6/1997 | |
| GB | 2340823 | 3/2000 | A47J 27/04 |
| JP | 2-109882 | 4/1990 | |
| JP | 4367476 A | 12/1992 | |
| JP | 06293366 * | 10/1994 | B65D 81/34 |
| JP | 09051767 * | 2/1997 | A23L 1/10 |
| JP | 10094370 A | 4/1998 | |
| JP | 10-129742 | 5/1998 | |
| JP | 11113511 * | 4/1999 | A23L 1/10 |
| JP | 2001348074 A | 12/2001 | |
| JP | 2005059863 A | 3/2005 | |
| JP | A-2005-312923 | 11/2005 | |
| JP | A-2006-34645 | 2/2006 | |
| MX | 01011879 A | 6/2002 | |
| SU | 1149999 A | 4/1985 | |
| WO | WO 86/00275 | 1/1986 | B65D 6/04 |
| WO | WO 96/07604 | 3/1996 | |
| WO | WO 98/33399 | 8/1998 | |
| WO | WO 99/59897 | 11/1999 | |
| WO | WO 02/051716 | 7/2002 | |
| WO | WO 03/086882 | 10/2003 | B65D 21/04 |
| WO | WO 2004/045970 A1 | 6/2004 | |
| WO | WO 2006/098950 A2 | 9/2006 | |
| WO | WO 2006/128156 A2 | 11/2006 | |
| WO | WO 2006/136825 | 12/2006 | B65D 81/34 |
| WO | WO 2007/003864 A2 | 1/2007 | |
| WO | WO 2008/109448 A3 | 9/2008 | |
| WO | WO 2009/097030 A1 | 8/2009 | |
| WO | WO 2009/136038 A1 | 11/2009 | |

OTHER PUBLICATIONS

Tupperware India, Cook easy Microsteamer, The Hindu Business Line, [on line], Jun. 26, 2003, retrieved on Oct. 21, 2011. Retrieved from the Internet: URL:<http://www.thehindubusinessline.in/catalyst/2003/06/26/stories/2003062600070406.htm>.*

Microwave mini steamer, Lunch in a Box, [on line] Feb. 12, 2007, retrieved on Oct. 13, 2011. Retrieved from the Internet: URL:<http://www.flickr.com/photos/24506652@N00/388209604/>.*

Microwave steamer 2, Oct. 16, 2006, [on line]. Retrieved from the Internet: URL:<http://www.flickr.com/photos/momsinmind/271170248/>.*

Starmaid Microwave Steamer Jun. 26, 2006, [on line], retrieved on Oct. 13, 2011. Retrieved from the Internet: URL:<http://www.flickr.com/photos/starmaid/5180282532/>.*

Progessive International Mini Steamer [on line] Jul. 18, 2006. Retrieved from the Internet at the URL in box W.* http://www.google.com/search?q=microwave+steamer&hl=en
&biw=1291&bih=1015&sa=X
&ei=0ZuXTqGMKbt0gGMyoHWBA&ved=0CAkQpwUoBg
&source=Int&tbs=cdr%3A1%2Ccd_min%3A%2Ccd_
max%3A8%2F2%2F2007&tbm=#pq=microwave+steamer&hl=en
&sugexp=gsih&cp=12&gs_id=9&xhr=t
&q=microwave+mini+steamer&pf=p&sclient=psy-ab&biw=1291
&bih=1015&tbs=img:1%2Ccdr%3A1%2Ccd_
max3A8%2F2%2F2006&.*

Mini Steamer—Progressive International / Starmaid vegetable steamer, [on line], retrieved Oct. 21, 2011. Retrieved from the Internet: URL:<http://www.campingcookwarepro.com/Progressive_International_Microwavable_Mini_Steamer>.*

International Search Report and Written Opinion mailed Oct. 20, 2008.

European Office Action mailed Jul. 15, 2010 in Application No. 08731136.1.

U.S. Official Action Mailed Dec. 11, 2008 in U.S. Appl. No. 11/286,008.

U.S. Official Action Mailed May 25, 2010 in U.S. Appl. No. 11/423,259.

U.S. Official Action Mailed Oct. 6, 2010 in U.S. Appl. No. 11/424,520.

U.S. Official Action Mailed Oct. 7, 2010 in U.S. Appl. No. 11/703,066.

U.S. Official Action Mailed Nov. 10, 2010 in U.S. Appl. No. 11/423,259.

U.S. Official Action Mailed Dec. 9, 2010 in U.S. Appl. No. 29/346,147.

U.S. Official Action Mailed Dec. 9, 2010 in U.S. Appl. No. 29/346,148.

U.S. Official Action Mailed Dec. 28, 2010 in U.S. Appl. No.29/364,804.

U.S. Official Action Mailed Feb. 23, 2011 in U.S. Appl. No. 29/369,419.

U.S. Official Action Mailed Mar. 21, 2011 in U.S. Appl. No. 11/703,066.

U.S. Official Action Mailed Apr. 1, 2011 in U.S. Appl. No. 11/424,520.

U.S. Official Action Mailed Apr. 6, 2011 in U.S. Appl. No. 12/277,886.

U.S. Official Action Mailed Apr. 8, 2011 in U.S. Appl. No. 29/369,416.

U.S. Official Action Mailed Apr. 12, 2011 in U.S. Appl. No. 29/369,423.

U.S. Appl. No. 29/346,147, filed Oct. 27, 2009 entitled "Container Assembly".

(56) References Cited

OTHER PUBLICATIONS

U.S. Appl. No. 29/346,148, filed Oct. 27, 2009 entitled Container Basket.
McCallister, "Microwaveable Pasta Product," U.S. Appl. No. 09/965,300, filed Sep. 28, 2001.
Certified copy of priority document in U.S. Appl. No. 12/012,403, filed Feb. 2, 2008 (filed in Int'l Application No. PCT/US2008/080874 on Nov. 3, 2008).
"Cafe Steamers," HealthyChoice.com, http://www.healthychoice.com/products/meals/cafe_steamers.jsp (Retrieved Aug. 2007), 1 pg.
"Ziploc® Containers With Snap'n'Seal Lids: Designed With You in Mind," brochure found at http://www.ziploc.com/food-storage-containers/, (Retrieved Nov. 14, 2005), 2 pgs.
"Ziploc® Containers With Snap'n'Seal Lids: Storage Made Simpler!," brochure found at http://www.ziploc.com/new_containers.html, (Retrieved Nov. 14, 2005), 1 pg.
Anchor Hocking '70 Catalog, p. 83, baking dishes at #4, 5 and 6 (Oct. 1970), 1 pg.
Photographs of a food tray available from Inter Frost GmbH at a trade show in Germany, Oct. 2005, 3 pgs.
http://www.unclebens.de/produkte/heiss_auf_reis/heiss_auf_reis_uebersicht.aspx, Mars Inc., 2006, 1 pg.
http://www.pastanmoresale.com, site accessed Jun. 15, 2010, 2 pgs. (now being sold at http://pastaboat.com).
Invitation to Pay Additional Fees with Partial International Search mailed Jun. 25, 2008.
International Search Report dated Aug. 20, 2008, Application No. PCT/US2008/055512.
International Search Report dated Jan. 12, 2009, Application No. PCT/US2008/077353.
U.S. Official Action Mailed Sep. 18, 2008 in U.S. Appl. No. 11/424,520.
U.S. Official Action Mailed Apr. 24, 2009 in U.S. Appl. No. 11/286,008.
U.S. Official Action Mailed Apr. 30, 2009 in U.S. Appl. No. 11/424,520.
U.S. Official Action Mailed Oct. 16, 2009 in U.s. Appl. No. 11/903,732.
U.S. Official Action Mailed Nov. 12, 2009 in U.S. Appl. No. 11/286,008.
U.S. Official Action Mailed Nov. 25, 2009 in U.S. Appl. No. 11/424,520.
U.S. Official Action Mailed Mar. 10, 2010 in U.S. Appl. No. 11/903,732.
U.S. Official Action Mailed Mar. 29, 2010 in U.S. Appl. No. 29/351,253.
U.S. Official Action Mailed Apr. 14, 2010 in U.S. Appl. No. 11/424,520.
U.S. Official Action Mailed May 21, 2010 in U.S. Appl. No. 11/286,008.
U.S. Notice of Allowance and Fees Due in U.S. Appl. No. 29/424,416.
U.S. Official Action mailed Mar. 26, 2012, in U.S. Appl. No. 11/424,520.
U.S. Official Action mailed Sep. 10, 2012, in U.S. Appl. No. 11/903,732.
U.S. Official Action mailed Jan. 24, 2013, in U.S. Appl. No. 12/471,114.
Propylene Glycol Monostearate; *Hawley's Condensed Chemical Dictionary Thirteenth Edition*; 1997.
European Search Report dated Jan. 27, 2011, in Application No. 08832921.4-1261.
Supp. International Search Report dated Mar. 15, 2011, Application No. PCT/CA2006/001894.
U.S. Official Action mailed Jul. 15, 2011, in U.S. Appl. No. 11/423,259.
European Allowance dated Jul. 18, 2011, in Application No. 10163678.5-2308.
U.S. Official Action mailed Aug. 5, 2011, in U.S. Appl. No. 11/286,008.
U.S. Official Action mailed Aug. 9, 2011, in U.S. Appl. No. 11/903,732.
U.S. Official Action mailed Aug. 11, 2011, in U.S. Appl. No. 11/703,066.
U.S. Official Action mailed Aug. 19, 2011, in U.S. Appl. No. 11/424,520.
U.S. Official Action mailed Aug. 25, 2011, in U.S. Appl. No. 12/277,886.
U.S. Official Action mailed Dec. 20, 2011, in U.S. Appl. No. 11,423,259.
U.S. Official Action mailed Jan. 11, 2012, in U.S. Appl. No. 11/703,066.
U.S. Official Action mailed Jan. 19, 2012, in U.S. Appl. No. 11/286,008.
U.S. Official Action mailed Jan. 25, 2012, in U.S. Appl. No. 11/903,732.
U.S. Official Action mailed May 2, 2012, in U.S. Appl. No. 11/903,732.
U.S. Official Action mailed May 2, 2012, in U.S. Appl. No. 12/040,641.
Succinylated Monoglycerides; http://www.fao.org/ag/agn/jecfa-additives/specs/Monograph1/Additive-443.pdf; 1982; obtained Sep. 14, 2012.
U.S. Official Action mailed Sep. 24, 2012, in U.S. Appl. No. 12/471,114.
U.S. Official Action mailed Sep. 25, 2012, in U.S. Appl. No. 12/040,641.

\* cited by examiner

COOKING APPARATUS AND FOOD PRODUCT

BACKGROUND

As contemporary society progresses, people spend Less time preparing and consuming meals. Fast food, such as food provided by drive through chain restaurants, provides one option for those who want their meal ready for consumption in a short time; however, many people do not desire fast food or cannot eat it, due to its lack of nutrition and in particular, its high calorie, salt, and fat content.

Prepared foods, such as those sold in supermarkets, take-out establishments, and the like, while appearing to be home cooked, are typically expensive. Additionally, like fast food, many of these prepared foods tack nutritional value, and are usually high in calories, salt, and fat. Accordingly, both fast food and prepared foods do not appeal to many consumers.

Consumers have found some suitability in frozen meals and prepackaged meals, such as those that can be heated in a microwave oven; however, these frozen meals are typically provided with mixed contents. Accordingly, when cooked or reheated, some of the contents may be undercooked, while some of the contents may be overcooked. Similarly, room temperature prepackaged meals may suffer partial degradation and discoloration of the components while in storage, and when heated in a microwave oven, the components may cook unevenly.

Typically, shelf stable, frozen, and/or refrigerated food products have a variety of undesirable attributes. Food products may combine differing types of food items (i.e., starches, sauces, proteins, vegetables, and/or fruits) together for manufacturing, processing, and/or cooking. Solid food items include starches, proteins, vegetables, and/or fruits. This is list is not meant to be restrictive. It is contemplated that other food items that are not viscous may be utilized without departing from the scope and intent of the disclosure. However, different types of food items require different freezing, processing, and/or cooking times. Over processing food items may cause negative effects on color, flavor, and texture. Therefore, these current food products have tow quality flavor and preparing them turns their components into a stew-like mixture.

Consumers desire tasty, high quality, convenient, and economical meals and snacks that are plateable. Plateability allows the consumer to choose between different food items that are cooked separately and then provided to the consumer for plating. Moreover, plateability allows the food items to be plated in a visually appealing manner. Plateability also allows the consumer to selectively mix food items. When serving gravy some individuals may want the gravy on the side for dipping, some may want the gravy on top of their food items, and others may not want gravy at all. A meal that is plateable allows an individual to decide how to serve the food items and/or sauces to his or her liking and allows consumers such as families and the commercial food service industry to provide these choices to individuals, even when serving more than one person.

Therefore, it would be desirable to provide cookable packaged food products that are high in quality, plateable, convenient, and economical, as well as a cooking apparatus for making such a food product.

SUMMARY

Accordingly, the disclosure is directed to a cooking apparatus and a food product.

The food product comprises a food item and a cooking apparatus. The food product may also comprise a package. The cooking apparatus may comprise a cooking tray, a cooking film, and/or a cooking bag.

The cooking apparatus may be utilized in a microwave oven, a conventional oven, a convection oven, a combination oven, and/or a pan of boiling water on top of a stove. The cooking apparatus may be comprised of metal, any suitable polymers, edible materials, and/or cellulose materials and in any suitable size or shape. The cooking apparatus may be designed to fit inside of or on top of standard sized pots, pans, and cookware. The cooking apparatus may include perforations and may have various configurations, such as a tray configuration, plate configuration, support configuration, bag configuration, film configuration, tray-in-tray configuration, trays-in-tray configuration, stilt configuration, or any other suitable configuration for holding food items above a heated liquid bath for cooking. The cooking apparatus may utilize compartments, inclines, ribbing, perforations, vents, opening means, lids, and/or sealing films.

The food product utilizes the cooking apparatus and food items to produce a meal, a portion of a meal, or a snack. The food product may be configured for an individual, a family, and/or a commercial food service. The food item may comprise a protein, a starch, a fruit, a vegetable, a sauce, and/or any edible liquid. The food product may also comprise spices, seasonings, steam flavorings, food item packets, and/or garnishes. The consumer may personalize the food product by hydrating a partially hydrated or dehydrated sauce with a desired liquid.

It is to be understood that both the foregoing general description and the following detailed description are exemplary and explanatory only. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
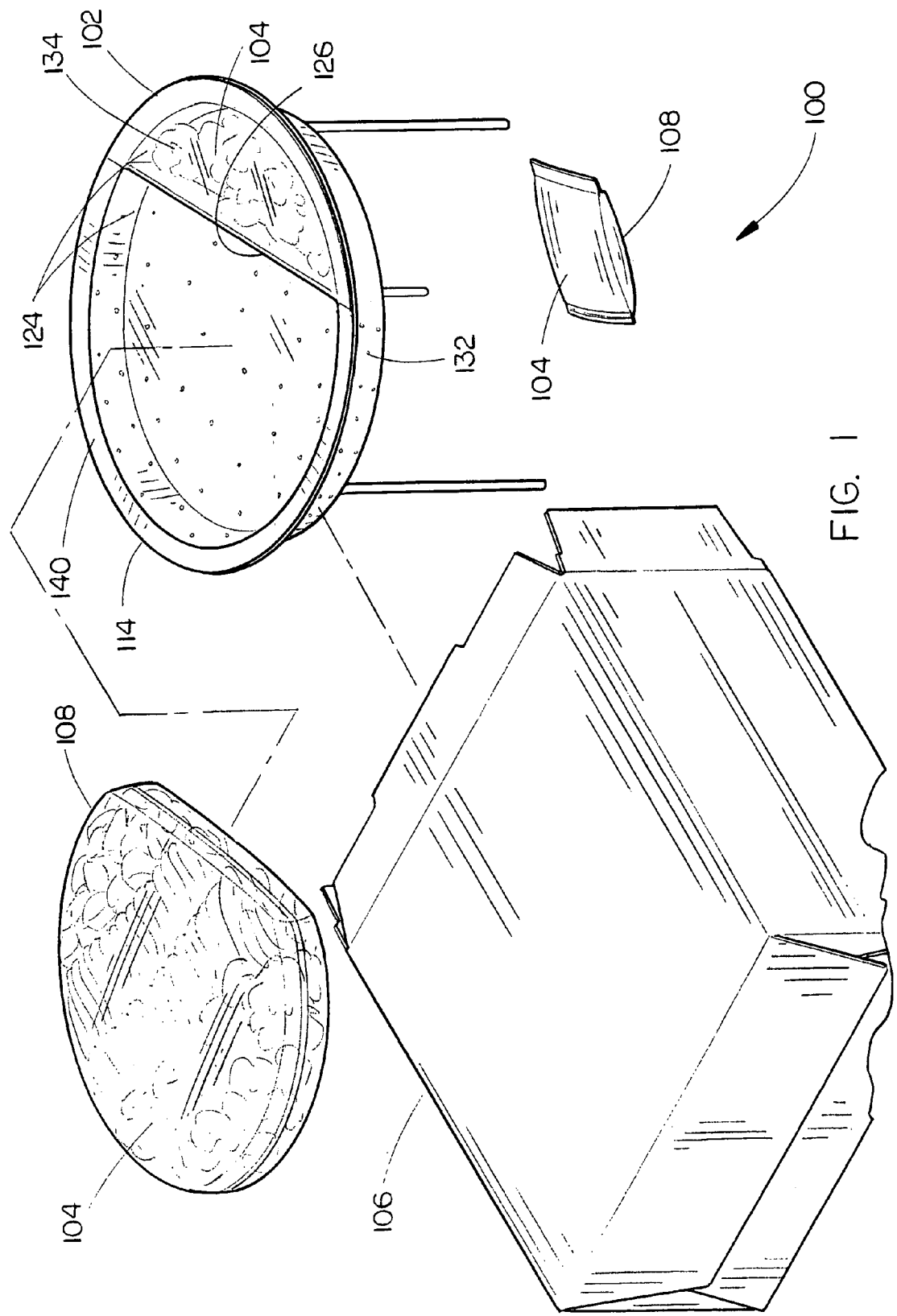
FIG. 1 is an isometric exploded view illustrating a food product, wherein the cooking apparatus is in a support configuration.
Figure 2:
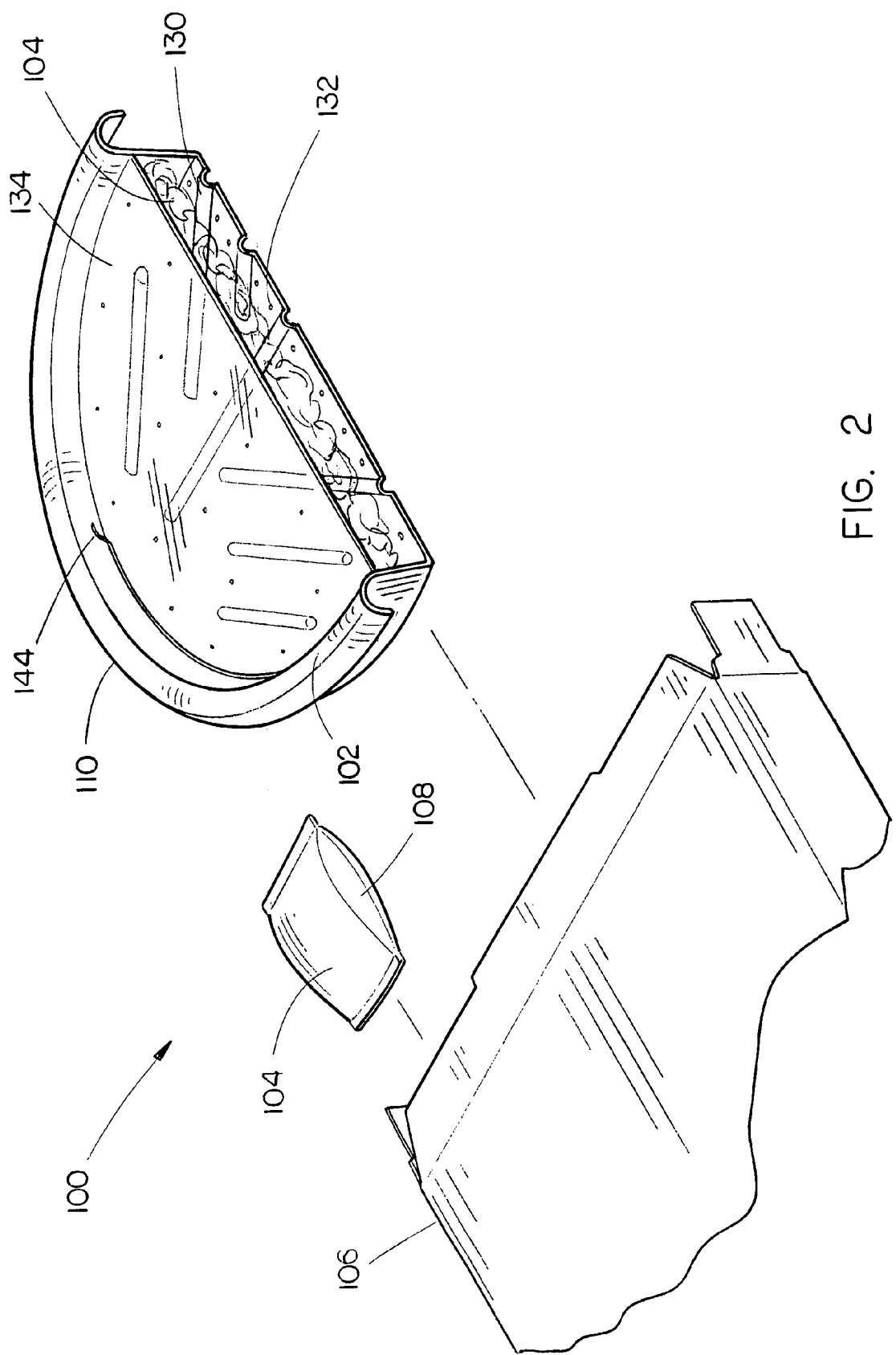
FIG. 2 is an isometric cross-sectional exploded view illustrating a food product, wherein the cooking apparatus is in a tray configuration.

Referring generally to FIGS. 1 through 16, a food product 100 is shown. The food product 100 may be a frozen, refrigerated, or shelf stable food product. The food product may be stored at temperatures ranging from ambient temperatures to freezing temperatures depending upon the application. The food product 100 comprises a cooking apparatus 102 and a food item 104. The food product 100 may further comprise a package 106 as illustrated in FIGS. 1, 2, and 9. The cooking apparatus is removed from the package 106 before cooking. It will be appreciated that a variety of packages 106 may be utilized with the food product 100.

The food product may contain a food item packet 152. The food item packet 152 is a container for storing food items that is not utilized in cooking and prevents and/or slows oxidation, degradation, freezer burn, and/or spoiling of the food item 104. The food items 104 are removed from the food item packet 152 before cooking or consumption. The food item packet 152 may be in any suitable shape or size for storing the food item.

The food item packet 152 and package 106 may be formed of material capable of displaying information about the food product or food item to attract and inform consumers. The food item packet 152 and the package 106 may be made of several materials, such as plastic, laminates, glassines, metal foils, cardboards, paper materials, thermoplastic films, multilayered flexible thin films, water insoluble wax and polymer coated materials, and/or polymers, such as ethyl vinyl alcohol copolymers, polyamide, and polyethylene terephthalate. It is contemplated that any suitable material for storing a food item for an extended period of time in ambient, refrigeration, or freezing temperatures that is capable of preventing and/or slowing oxidation, degradation, freezer burn, and/or spoiling of the food items may be utilized without departing form the scope and intent of the disclosure.

The food product 100 may separate food items 104, such that the separateness and integrity of at least two different types of food items are maintained from processing (fitting and packaging) through storage and/or cooking. Processing as used herein comprises filling, packaging, preserving, mixing, and freezing. The food product 100 may separate food items 104 by utilizing a cooking apparatus 102 and/or a food item packet 152 designed for holding food items to maintain the separateness and integrity of each food item 104 during storage and/or cooking. The different food items 104 may be combined after cooking. The food item 104 may comprise sauces, starches, proteins, fruits, vegetables, and/or any edible liquid. This list is exemplary only and is not meant to be restrictive of the disclosure. It is contemplated that a variety of edible products may be utilized without departing from the scope and spirit of the disclosure.

The cooking apparatus 102 is designed to sit in or over another cooking device 136 already owned by a consumer, such as a sauce pan, cake pan, ceramics, or any other commonly owned cookware. Any suitable means for attaching the cooking apparatus 102 to the cooking device 136 to allow for cooking by a heated liquid in the cooking device 136 may be utilized. As used herein "a support member for supporting the support portion" is any suitable means for attaching the cooking apparatus 102 to the cooking device 136 to allow for cooking by a heated liquid in the cooking device 136. As used herein "a support portion for suspending a first food item above a heatable liquid that is at least partially perforated" comprises the planar portion of the cooking apparatus that mimics the height of the cooking device or is at a height that provides enough room to boil/heat a heatable liquid in the cooking device below the cooking apparatus and is substantially parallel to the bottom surface of the cooking device or the surface of the cooking device that is adjacent to the heat source, ground, table, floor, or counter when utilized for cooking. The cooking apparatus 102 may allow for at least one food item to be steam cooked by utilizing a heated/boiling heatable liquid contained in the cooking device 136. As used herein, a consumer is defined as an individual, a family, and/or the food service industry. Furthermore, the cooking apparatus is for cooking the food items to substantially contemporaneous completion by a boiling liquid.

The cooking apparatus 102 comprises cooking trays 140, cooking bags 108, and/or cooking films 148. As used herein a cooking tray 140, a cooking bag 108, or a cooking film 148 may be referred to as a component or collectively as components of the cooking apparatus 102. As used herein a cooking tray is a solid molded and semi rigid structure for holding food items during cooking. The cooking tray 140 may be of the type disclosed in patent application Ser. No. 11/703,066 herein incorporated by reference. The cooking trays 140, the cooking bags 108, and/or the cooking films 148 may be perforated. The cooking trays 140, the cooking bags 108, and/or the cooking films 148 may be partially perforated. The cooking bag 108 may be laser perforated, or a mesh cooking bag. The cooking bag 108 may be of the type disclosed in U.S. patent application Ser. No. 11/880,458 filed on Jul. 20, 2007 herein incorporated by reference. The mesh cooking bag may be of the type disclosed in U.S. Patent Application Ser. No. 60/918,610 herein incorporated by reference.

The cooking apparatus 102 may be utilized in a in a microwave oven, a conventional oven, a convection oven, a combination oven, and/or in a pan of boiling water on a stove top. The cooking apparatus may be made of polymers, such as Polypropylene (PP) (e.g., Co-polymer Polypropylene), Crystallized Polyethylene Terepthalate (CPET), cellulose materials, metal, or any other microwave and food safe non-toxic material. The cooking apparatus may be made of conventional polymer forming and working techniques. Suitable forming and working techniques include injection molding, rotational molding, and the like, as welt as thermoforming. The cooking apparatus may also be made of edible materials, such as tapioca, bamboo, and/or any other suitable edible materials for cooking and/or maintaining the separateness of the food items. The cooking apparatuses 102 are suitable for refrigeration storage, freezer storage, shelf-stable storage, and subsequent heating without substantial deformation. The cooking apparatus may be comprised of metal, plastic or polymer based material, and/or cellulose. It is contemplated that other suitable materials capable of withstanding the high temperatures exposed to cookware may be utilized without departing from the scope and intent of the disclosure. If a cooking apparatus 102 utilizes a cooking bag or cooking film 148, the material of the cooking bag 108 or cooking film 148 may be comprised of a combination of nylon, EVOH, polyofins, polyesters, or metalized polymer films.

Figure 11:
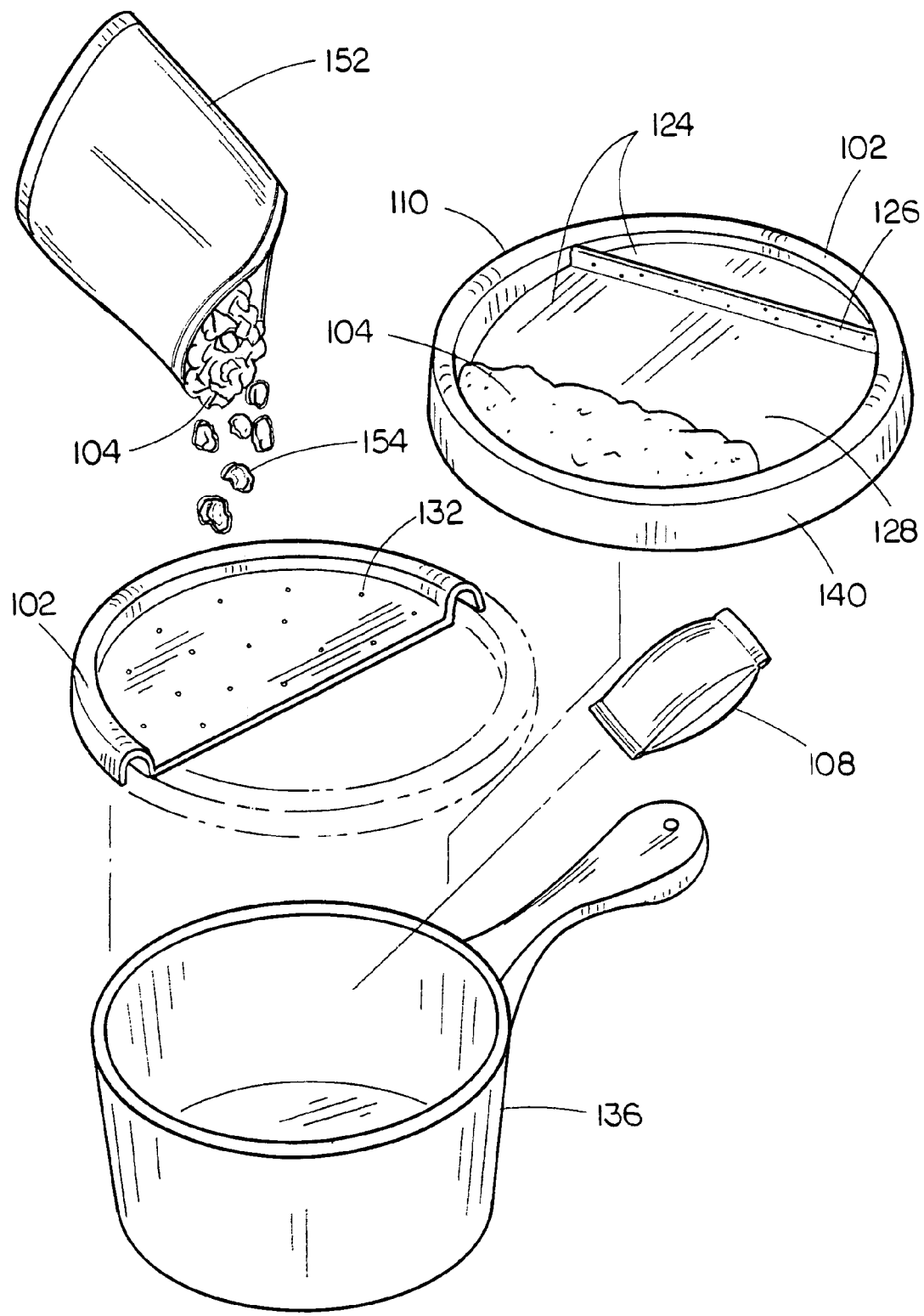
FIG. 11 is an isometric exploded view illustrating a food product, wherein the cooking apparatus is in a tray-in-tray configuration with a liquid permeable divider.

Further, the cooking apparatus 102 may have perforations 132 or may be partially perforated. The perforations may be of any size or shape as long as the perforations do not allow food items to fall through them. The cooking apparatus may have compartments 124 that are separated by a divider 126 as illustrated in FIGS. 1 and 11. The divider 126 may be liquid permeable. A cooking apparatus 102 may include an inclined surface 128 or a ribbed surface 130 to protect food items during cooking from accumulated liquid or to direct accumulated liquid towards a specific food item as shown in FIGS. 2 and 11. The cooking apparatus 102, a cooking tray 140 of the cooking apparatus, or a compartment 124 of the cooking tray 140 may be sealed with a film 134, as illustrated in FIGS. 1 and 2, or sealed with a lid. Suitable films for sealing cooking trays 140 may be made of nylon, EVOH, polyofins, polyesters, any suitable polymer, metalized polymer films, heat sealable paper, cellophane, foil, or combination thereof. It is contemplated that other types of films for sealing cooking trays 140 during cooking and/or storage maybe utilized without departing from the scope and intent of the disclosure. The lid may be comprised of polymers, such as Polypropylene (PP) (e.g., Co-polymer Polypropylene), Crystallized Polyethylene Terepthalate (CPET), or any other microwave and food safe non-toxic material. The lid may also be a semi-rigid that snaps on to a cooking tray. The snap on lid may allow a cooking tray to be opened and resealed. It is understood that other types of lids for sealing cooking trays 140 during cooking and/or storage maybe utilized without departing from the scope and intent of the disclosure.

The cooking apparatus may be configured in several different ways to provide different desired meals or snacks. The varying configurations are designed to provide convenient or fast, easy, and simple separations of the food items 104 contained in the cooking apparatus. The most convenient configuration may be different for the individual consumer verses the commercial food service industry.

The cooking apparatus 102 may be in a tray configuration 110, plate configuration 112, support configuration 114, bag configuration 116, film configuration 118, tray-in-tray configuration 120, trays-in tray configuration 122, stilt configuration 150, or any other suitable configuration for holding food items above a heated liquid contained in a cooking device 136. The cooking apparatus regardless of the configuration is for cooking at least two food items to substantially contemporaneous completion by a boiling liquid.

Figure 12:
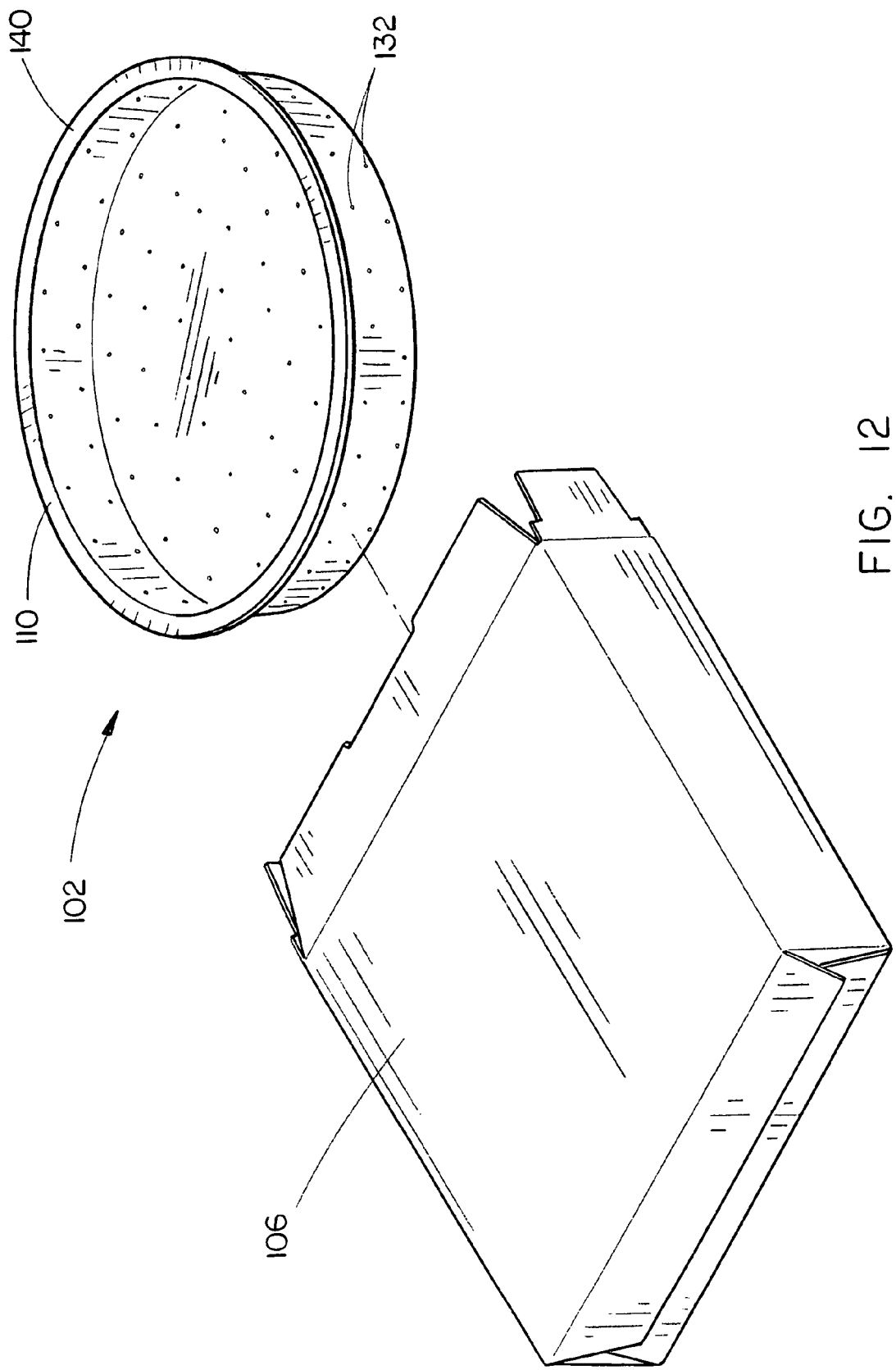
FIG. 12 is an isometric view of a cooking apparatus.

As shown in FIGS. 2 and 12, the cooking apparatus 102 is in a tray configuration 110. In a tray configuration 110 the cooking tray has a lip (a support member) around its edge that is designed to fit over the rim of a consumer owned cooking device 136. When the cooking tray 140 is resting on the rim of the cooking device 136 the portion of the cooking tray 140 that holds the food items above heated liquid inside of the cooking device is slightly recessed as illustrated in FIGS. 2 and 12. The cooking tray is only slightly recessed (support portion) to allow for enough space to heat a liquid in the cooking device below the cooking tray for cooking the food items in the cooking apparatus. A cooking tray is slightly recessed when one plane of the cooking tray is closer to the plane of the cooking device that is closest to the floor of the heating medium (e.g., convection oven, stove, or microwave).

Figure 5:
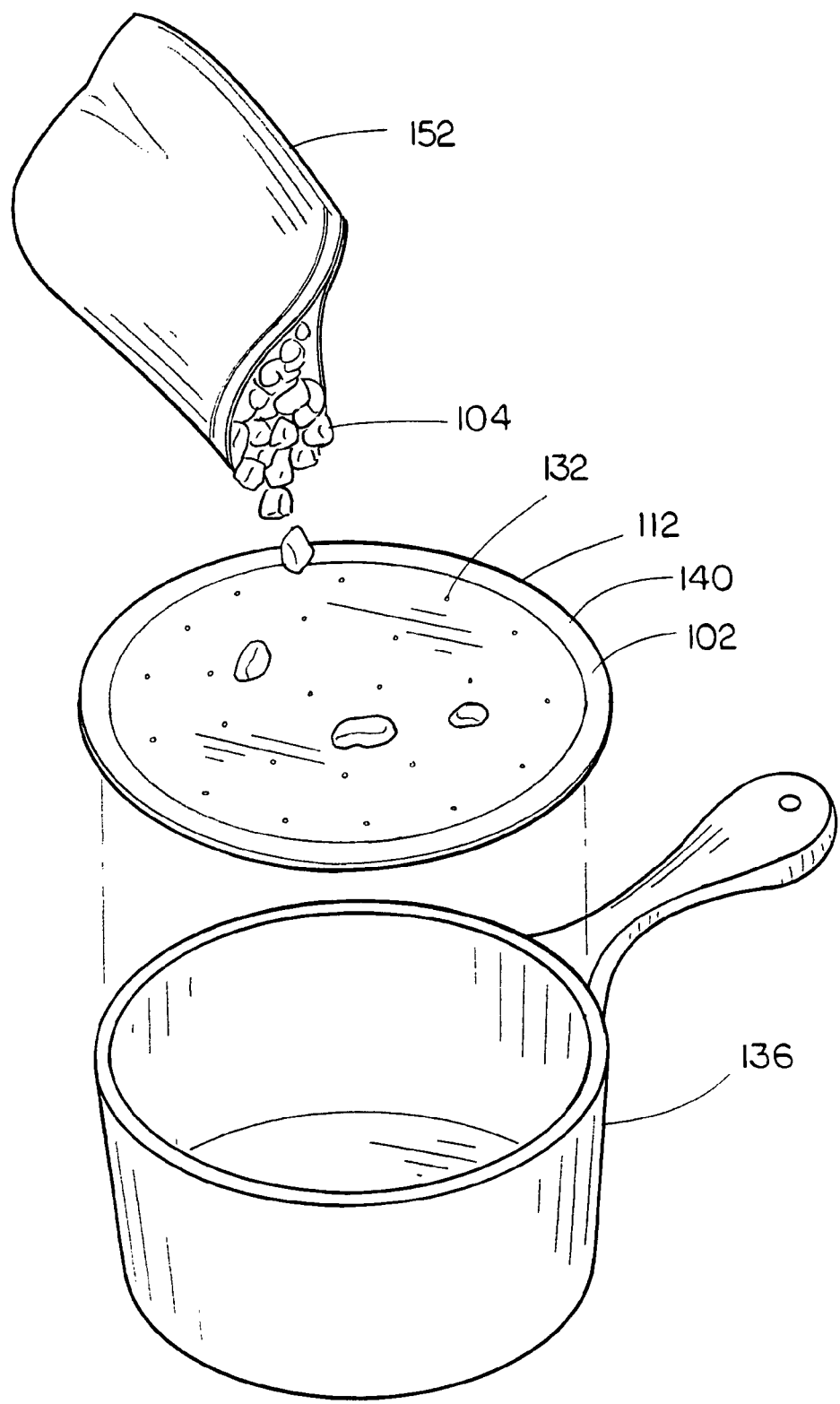
FIG. 5 is an isometric view illustrating a food product, wherein the cooking apparatus is in a plate configuration.

As show in FIG. 5, the cooking apparatus 102 is in a plate configuration 112. Again, in a plate configuration 112 the cooking tray 140 has a lip around its edge that is designed to fit over the rim of a consumer owned cooking device 136. However, in a plate configuration 112, the cooking tray 140 is not recessed creating a flat plane across the opening of the cooking device 136 (a support portion). The plate configuration may have a raised border above its lip and above the rim of the cooking device 136 to prevent water from dripping over the lip of the cooking tray 140 and down the outside of the cooking device 136.

Figure 10:
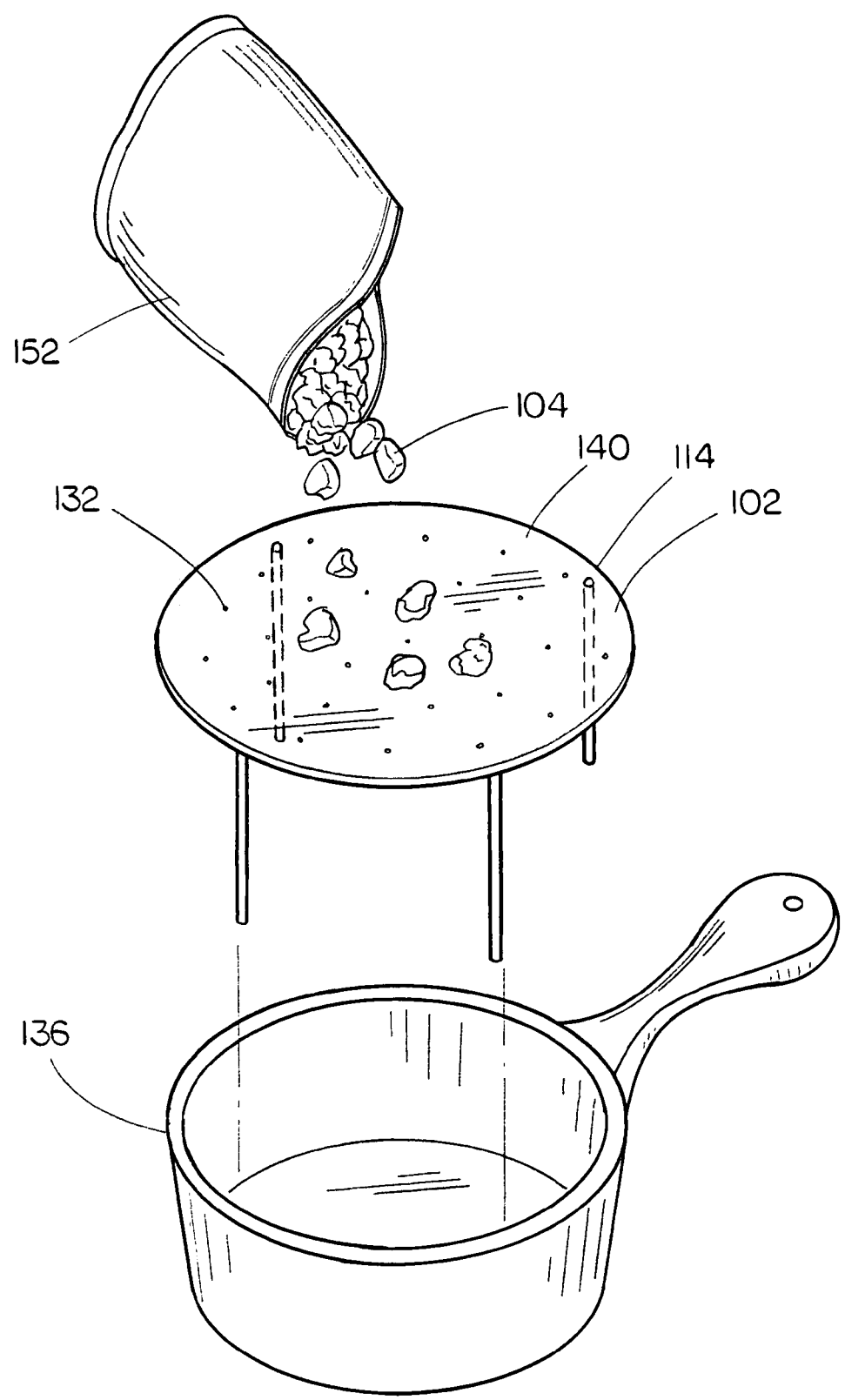
FIG. 10 is an isometric exploded view illustrating a food product, wherein the cooking apparatus is in a plate and support configuration.

As show in FIGS. 1 and 10, the cooking apparatus 102 is in a support configuration 114. The support configuration 114 may have a cooking tray 140 that is slightly recessed like the cooking tray in the tray configuration 110 or cooking tray a without any recess, like the plate configuration 112. However, in the support configuration 114 the cooking tray 140 has legs that rest inside of the cooking device 136 with the heated liquid that hold the cooking tray 140 above the heated liquid. The height of the legs is designed to mimic the height of the cooking device and/or at least at a height to provide enough room to heat/boil a heatable liquid within the cooking device 136 below the cooking tray for boiling the heatable liquid. The cooking tray 140 in the support configuration 114 must have at least one leg. The cooking tray 140 of the support configuration 114 may have two legs. The cooking tray 140 of the support configuration 114 may have three legs. The cooking tray 140 of the support configuration 114 may have four legs.

Figure 3:
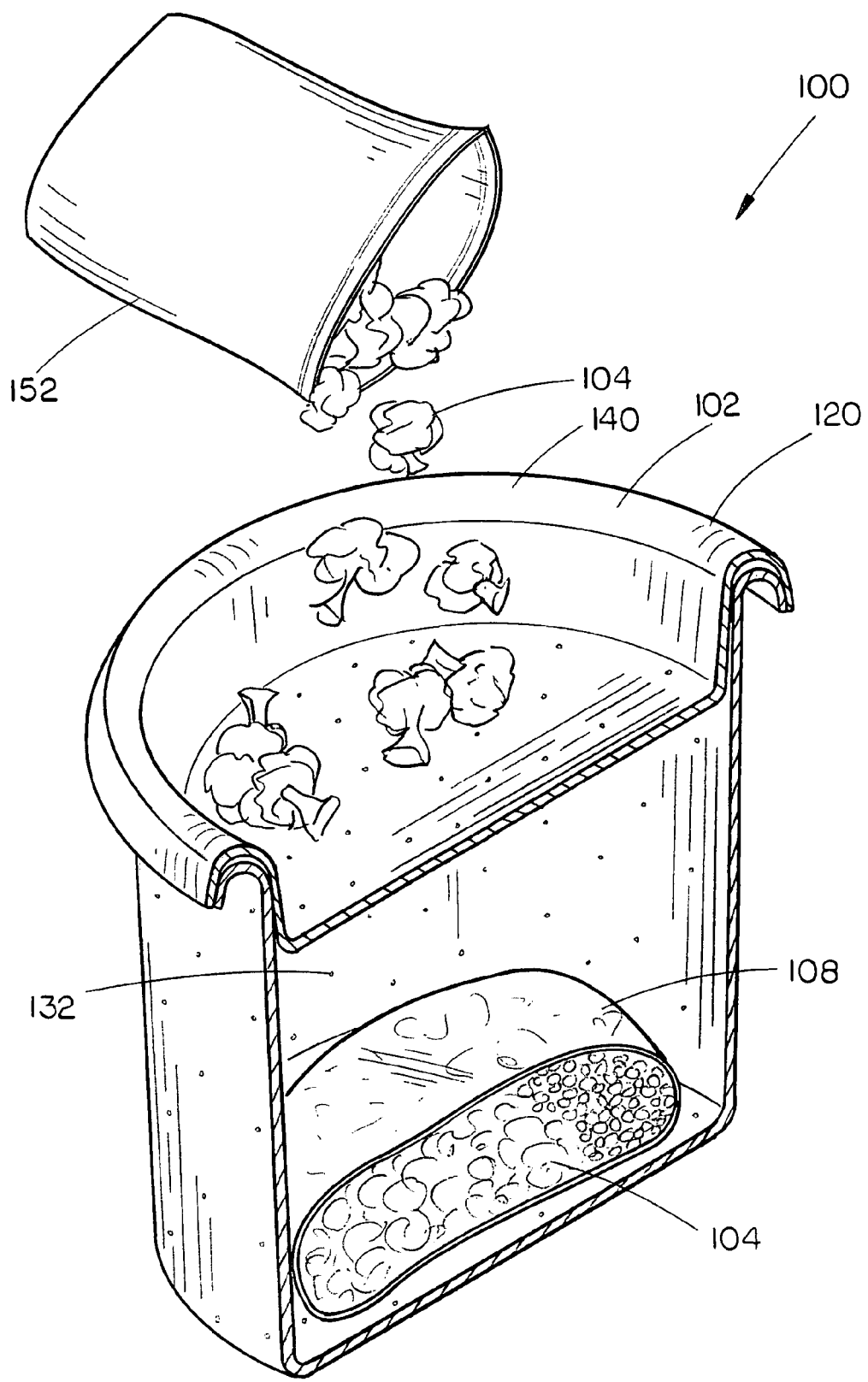
FIG. 3 is an isometric cross-sectional view illustrating a food product, wherein the cooking apparatus is in a tray-in-tray configuration.
Figure 15:
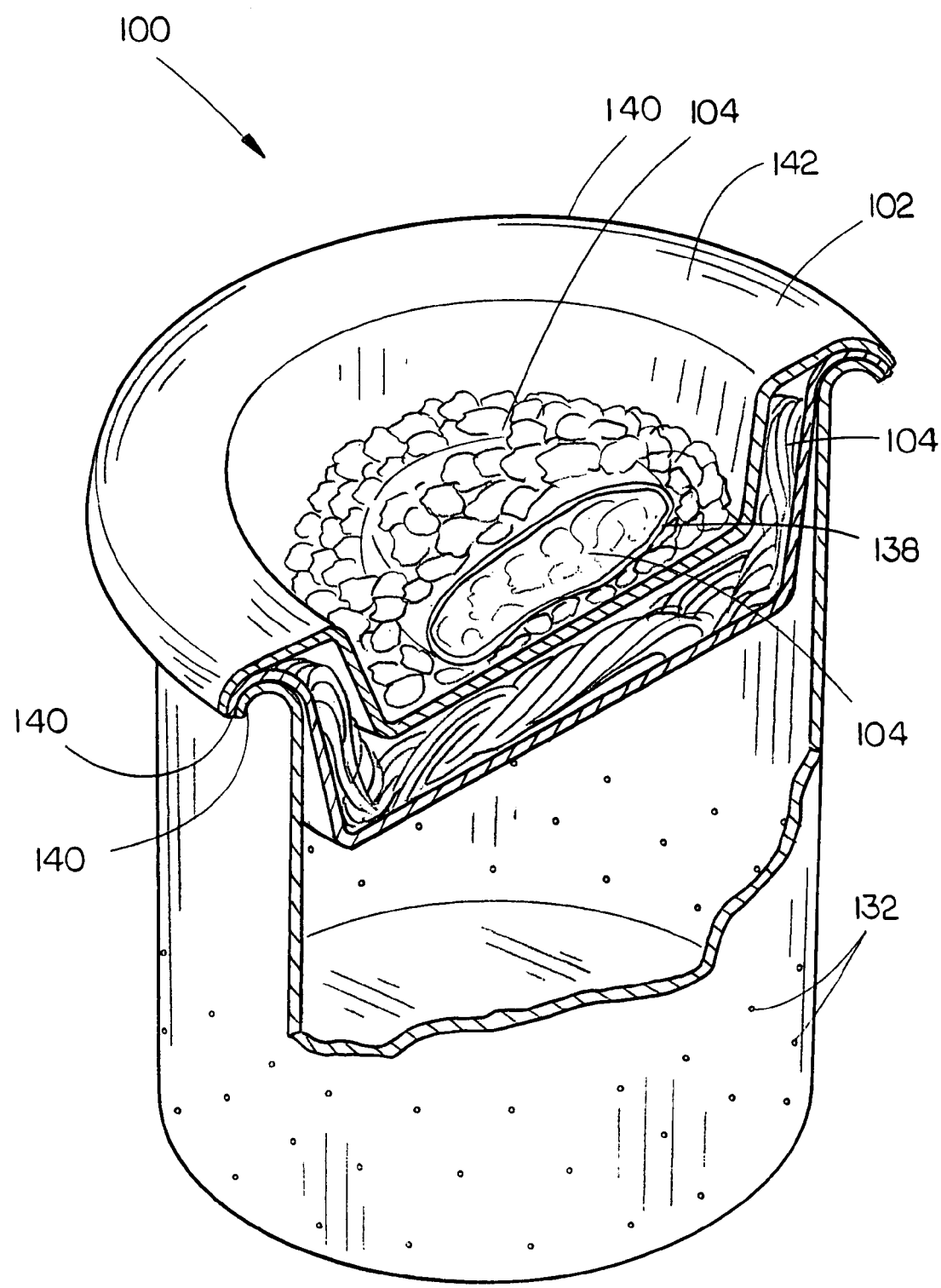
FIG. 15 is a partial cross-sectional view illustrating a food product, wherein the cooking apparatus is in a trays-in-tray configuration with food insulated cooking trays and cooking bags.

As show in FIGS. 3, 9, and 11, the cooking apparatus 102 is in a tray-in-tray configuration 120. The tray-in-tray configuration 120 comprises two cooking trays 140. One cooking tray will fit within the other cooking tray. As used herein, the base tray is the cooking tray closest to the cooking device. A cooking tray that fits fully or partially into the base cooking tray will be referred to as a basket-tray from herein on. The base cooking tray is perforated and may mirror the interior cooking surface of the cooking device as illustrated in FIGS. 3 and 15. The perforations in the base tray may allow the liquid in the cooking device to fill the base tray and will remain there during heating. The basket-tray of the tray-in-tray configuration may be in the shape of the cooking tray in the tray configuration 110 or in the plate configuration 112, but the lip of these basket-trays will be designed to rest over the rim of the base cooking tray as illustrated in FIGS. 3, 9, and 11 instead of the cooking device 136. The cooking tray may have supports (support member) to hold it above the base tray instead of utilizing a lip. A food item 104, such as sauce, may be contained in a cooking bag 108 located inside of the base cooking tray that cooks the food item 104 in the cooking bag by being immersed in the heated liquid that fills the base cooking tray as illustrated FIG. 3.

The base tray may be equivalent to the cooking tray 140 in the tray configuration 110 in the tray-in-tray configuration 120. However, the basket-tray is designed to snugly fit inside the base cooking tray with a lip that rests on the lip of the base cooking tray as illustrated in FIG. 11. The basket-tray and/or base tray may have a portion of its lip that extends past the base cooking tray to create a type of handle for the consumer to allow for easy removal of the cooking apparatus or cooking trays.

The base tray may be equivalent to the cooking tray 140 of the support configuration 114 as illustrated in FIG. 9 in the tray-in-tray configuration 120. Again, the basket-tray of the tray-in-tray configuration 120 may be in the shape of the cooking tray 140 in the tray configuration 110 or the plate configuration 112, but the lip of these basket-trays will be designed to rest on the rim of the base cooking tray.

Figure 4:
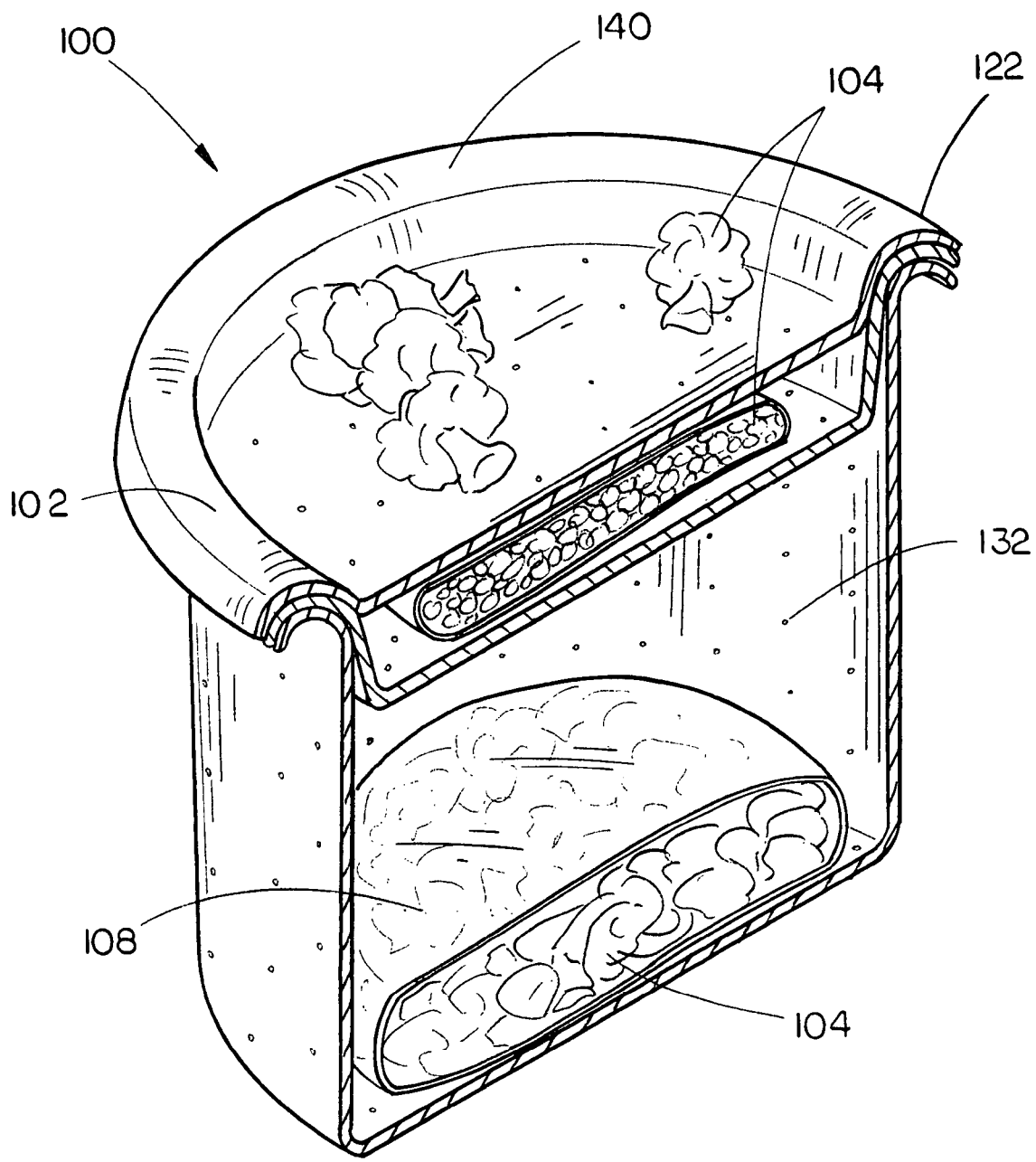
FIG. 4 is an isometric cross-sectional view illustrating a food product, wherein the cooking apparatus is in a trays-in-tray configuration.
Figure 13:
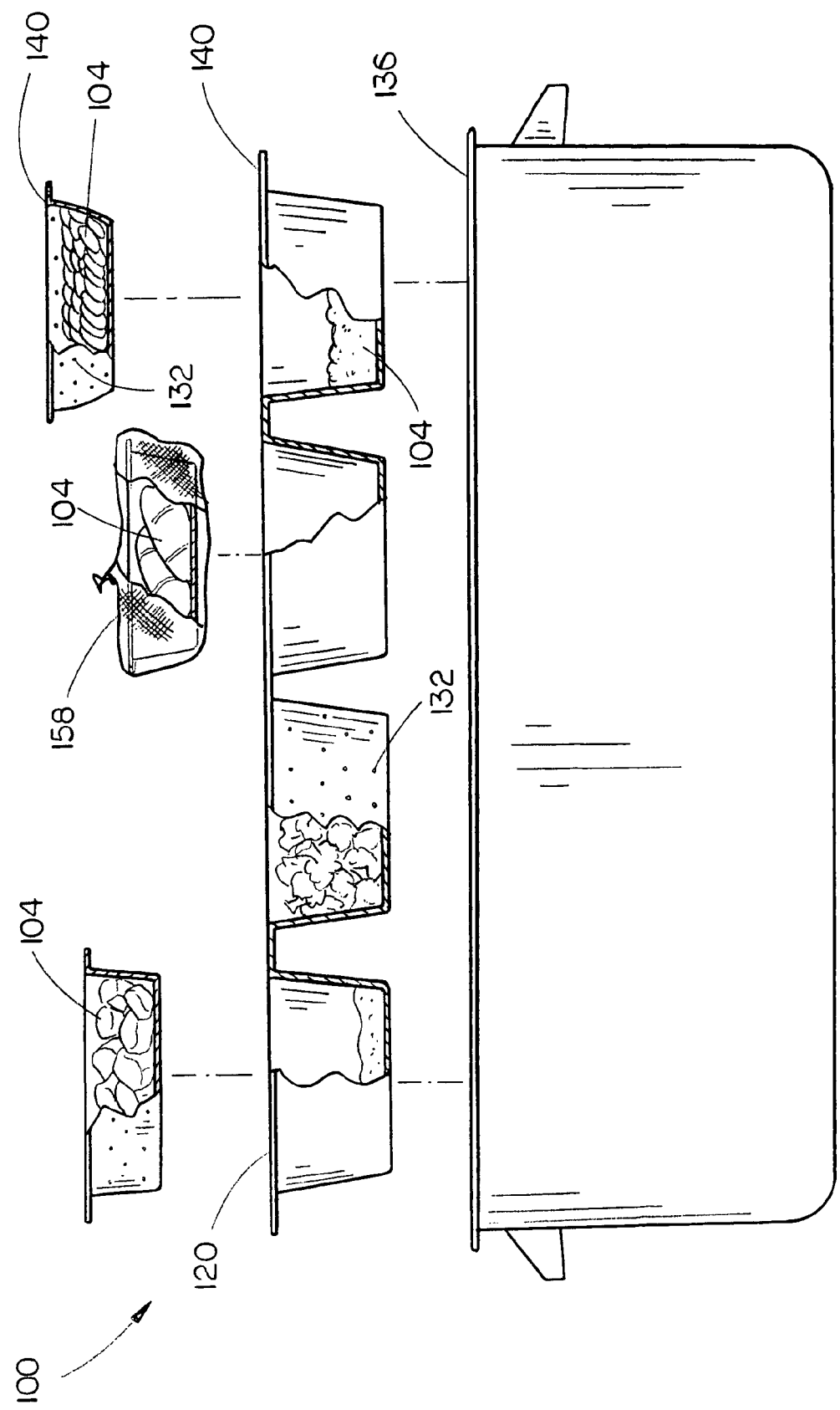
FIG. 13 is an isometric exploded view illustrating a food product, wherein the cooking apparatus is in a tray-in-tray configuration with a base tray that has troughs.
Figure 14:
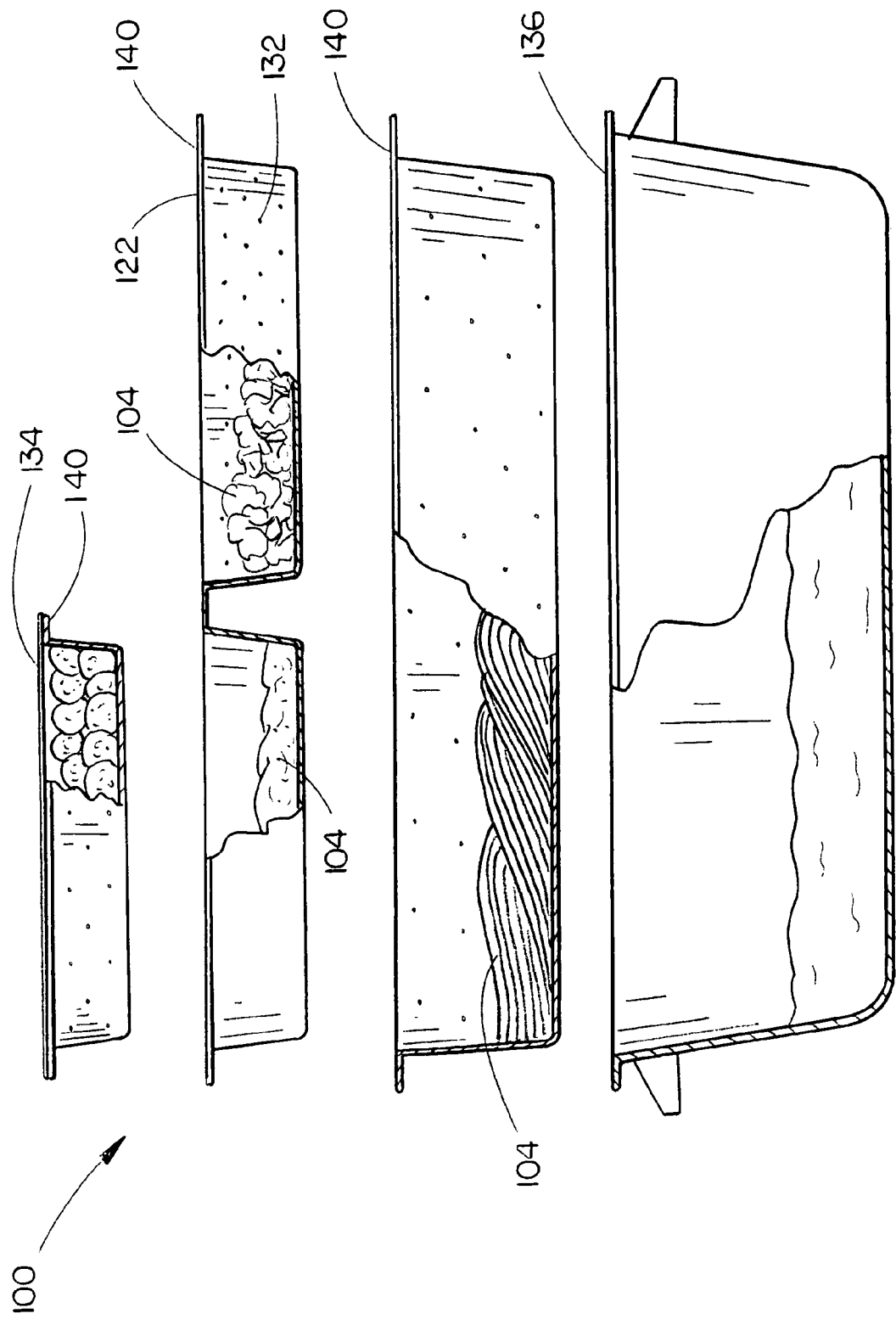
FIG. 14 is an isometric exploded view illustrating a food product, wherein the cooking apparatus is in a tray-in-tray configuration with a basket-tray that has troughs.

As show in FIGS. 4, 13, 14, and 15 the cooking apparatus 102 is in a trays-in-tray configuration 122. The trays-in-tray configuration 122 comprises a base cooking tray that at least two basket-trays sit in. The base cooking tray may be equivalent to any of the base cooking trays described in the tray-in-tray 120 configurations. The basket-trays may be designed to stack on top of each other as illustrated in FIG. 4. The base tray may comprise troughs that different basket-trays rest on top of as illustrated in FIG. 13. The basket-tray of the trays-in-tray configuration may contain troughs to support other basket-trays as illustrated in FIG. 14. Multiple trough basket-trays may have stackable secondary basket-trays that fit within the troughs of the other basket-tray as illustrated in FIG. 14. It is contemplated that various designs of trays-in-tray configurations that allow a heated liquid in a cooking device 136 to be utilized for cooking may be utilized without departing from the scope and intent of the disclosure.

Figure 6:
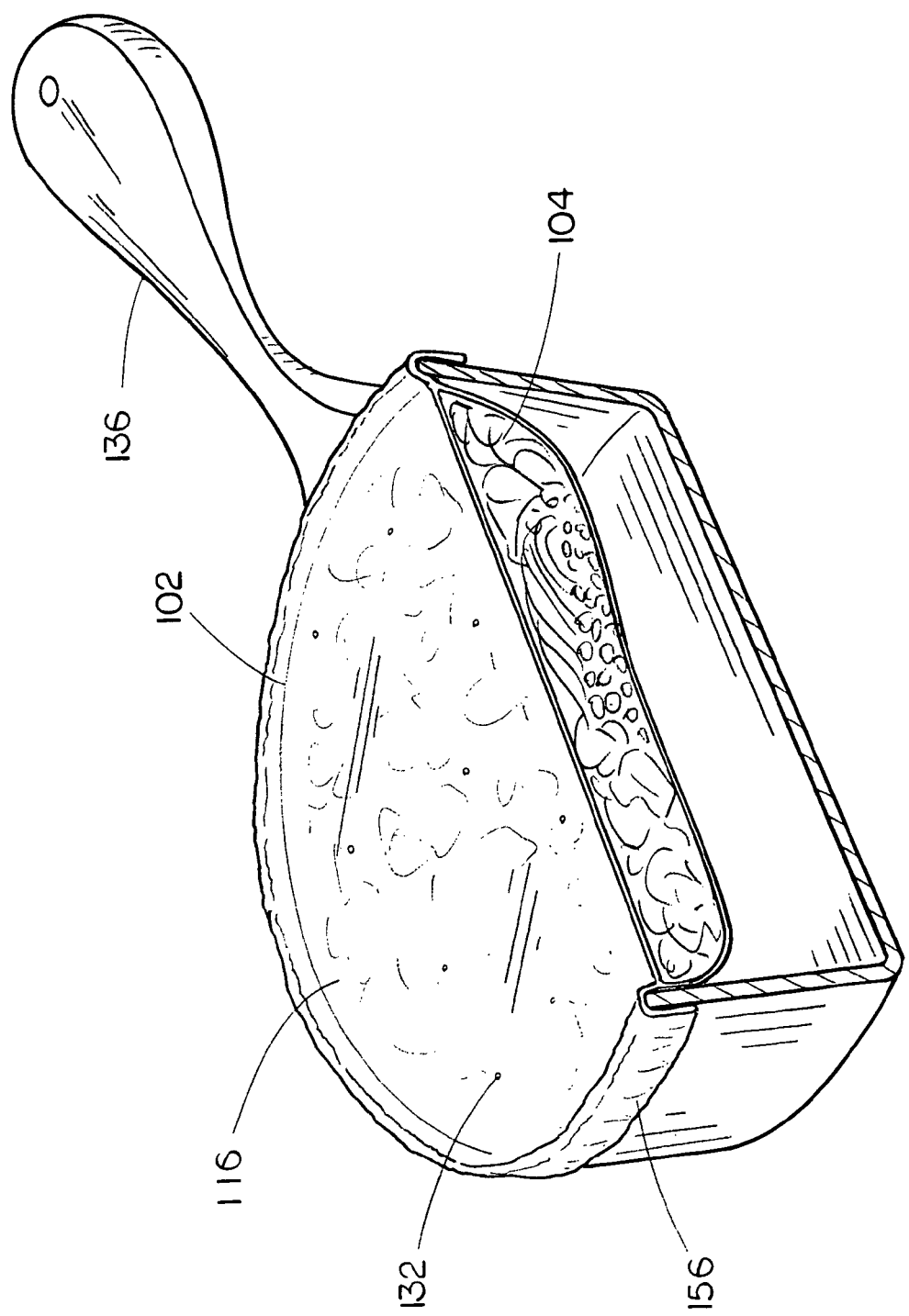
FIG. 6 is an isometric cross-sectional view illustrating a food product, wherein the cooking apparatus is in a bag configuration.

As show in FIG. 6, the cooking apparatus 102 is in a bag configuration 116. The bag configuration 116 comprises a perforated cooking bag 108 with a peripheral portion 156 (a support member) for attaching to a cooking device as illustrated in FIG. 6. The perforated cooking bag with a peripheral portion 156 for attaching to a cooking device may enclose other cooking bags 108 that contain additional food items 104 in the bag configuration 116 or other cooking bags 108 may be disposed in the perforated cooking bag with a peripheral portion 156. The peripheral portion 156 of the cooking bag 108 may be attached to the cooking device by static cling, elastic, adhesives, friction, and/or any other suitable means that maintains the weight of the food items and withstands the heat of the cooking device without detaching.

Figure 7:
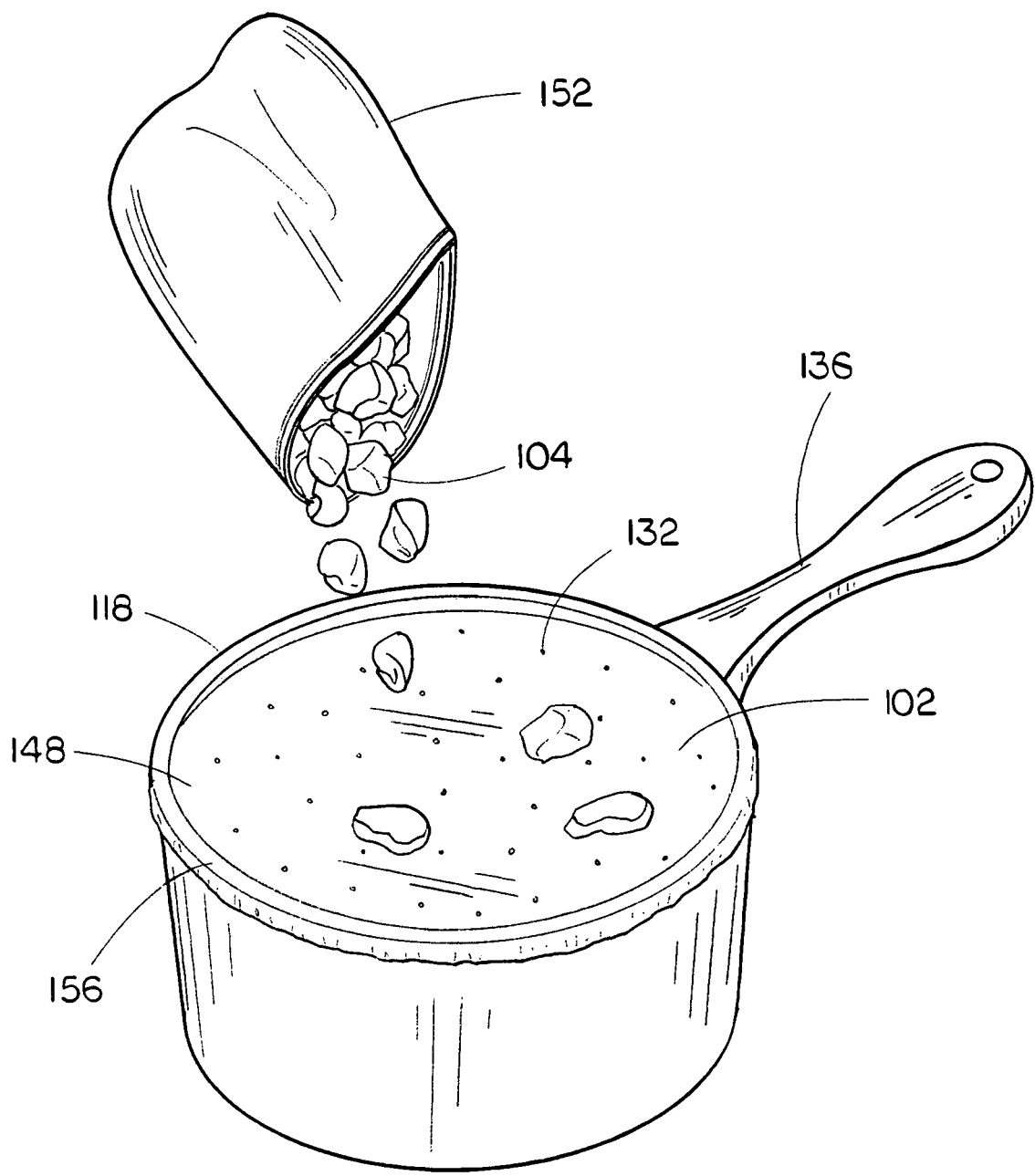
FIG. 7 is an isometric view illustrating a food product, wherein the cooking apparatus is in a film configuration.

As show in FIG. 7, the cooking apparatus 102 is in a film configuration 118. The film configuration 118 includes a perforated film with a peripheral portion 156 that wraps over the rim of the cooking device to attach the film to the cooking device. The film is utilized to support food items above heated liquid in a cooking device to cook the food items 104. The peripheral portion 156 of the film 148 may be attached to the cooking device by static cling, elastic, adhesives, friction, and/or any other suitable means that maintains the weight of the food items and withstands the heat of the cooking device without detaching.

Figure 8:
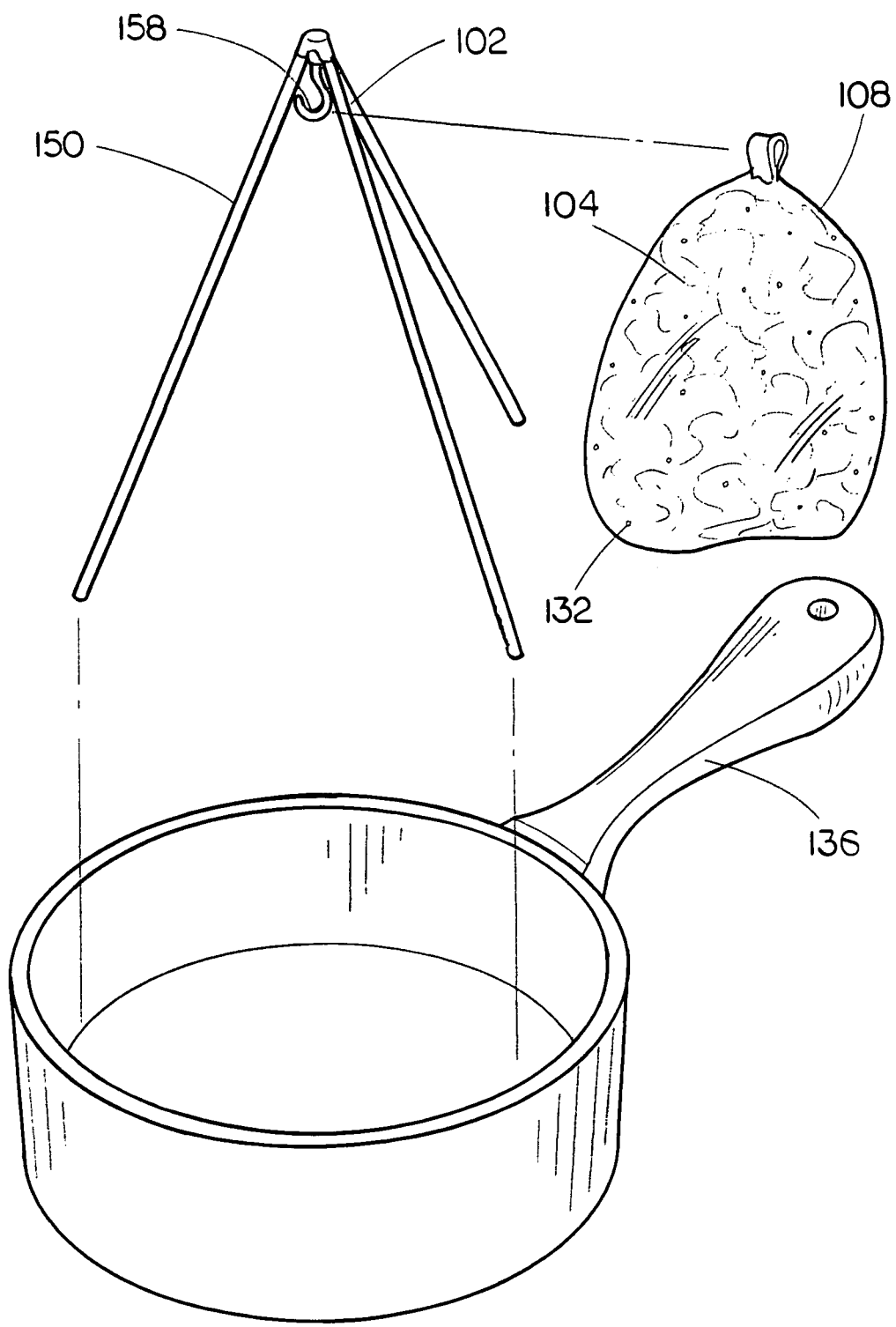
FIG. 8 is an isometric exploded view illustrating a food product, wherein the cooking apparatus is in a stilt configuration.
Figure 9:
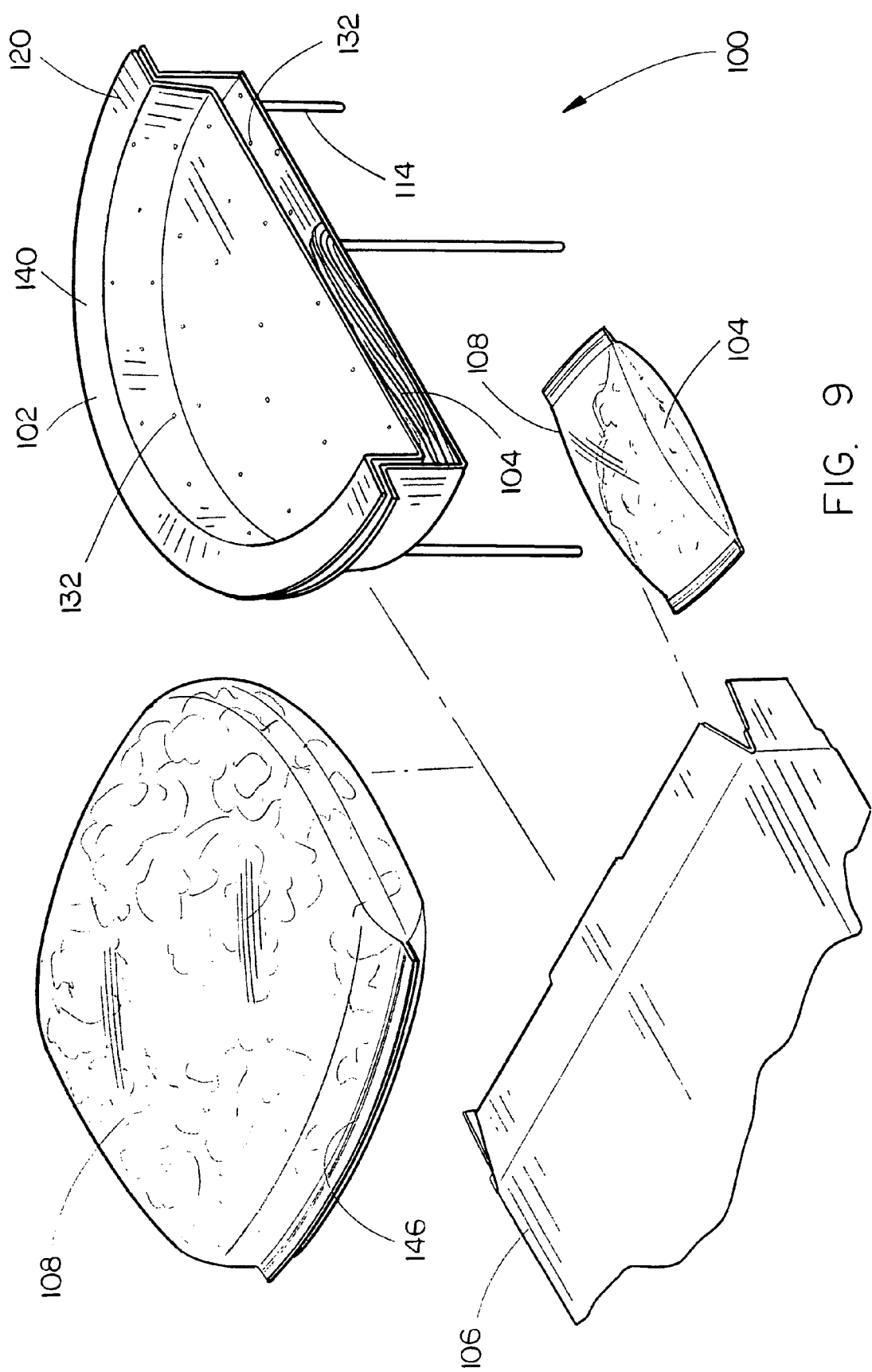
FIG. 9 is an isometric cross-sectional exploded view illustrating a food product, wherein the cooking apparatus is in a tray-in-tray and support configuration.

As show in FIG. 8, the cooking apparatus 102 is in a stilt configuration 150. The stilts configuration 150 comprises at least one perforated cooking bag, a stilted leg, and a bag attachment site 158 as illustrated in FIG. 8. The bag attachment site 158 may be a hook, a snap, a button, a clamp, or any other suitable means for holding food items above a heat liquid bath for cooking. The cooking apparatus in a stilt configuration is placed inside the cooking device 136 containing the heated liquid. The cooking bag is then placed on the bag attachment site above the heated liquid to allow for cooking. Multiple Legs may be utilized to support the cooking bag above the heated Liquid as illustrated in FIG. 8. The perforated cooking bag 108 may enclose other cooking bags 108 that contain additional food items 104 in the stilt configuration 150. The bag attachment site 158 may be capable of suspending multiple bags. The cooking apparatus may have multiple bag attachment sites 158 for multiple cooking bags. The stilts may also be configured to support a cooking film 148 instead of a cooking bag 108 in order to suspend at least one food item above the heated Liquid. Multiple silts may be utilized for supporting multiple cooking bags 108 and/or cooking films 148.

The cooking apparatus 100 may be configured to insulate interior cooking bags and interior trays with food items as illustrated in 16. These interior insulated cooking bags 138 or interior insulated cooking trays 142 may not reach the same high temperature as cooking bags and cooking trays closer to the exterior of the cooking apparatus; therefore, this configuration may allow for the utilization of different lower melt-point cooking trays 140 and cooking bag materials that are cheaper and easier to shape. By insulating the interior cooking trays or cooking bags the interior cooking bags 138 and interior cooking trays are only heated to about 185° F. with a fail safe of about 212° F. The material of the insulated cooking bag 138 may comprise nylon; Polyethylene Terepthalate (PET); PP; EVOH; polyurethane; formed, opened, or closed cellulose structures; or combinations, blends or laminations thereof. The material of the insulated cooking trays 142 may comprise PP (melting point of 348.5° F.), Poly(1-butene) (melting point of 270° F.), and polyethylene (melting point of 278° F.). It is understood that other material may be utilized for cooking trays and cooking bags that will not melt at temperatures of 218° F. and below without departing from scope and intent of the disclosure.

Any of the cooking trays 140 described herein may be disposed within a non-venting film overwrap, such as those disclosed in U.S. patent application Ser. No. 11/636,260, herein incorporated by reference and is presented in FIG. 13. A cooking apparatus 102 may comprise a base container and one or more basket-trays disposed within a non-venting film overwrap 158. The film 158 may comprise a nylon blend having selected physical properties such that it may maintain a closed cooking environment in both microwave and radiant-heat cooking environments. In order to be non-venting, the film 158 may be capable of maintaining an internal cooking environment that remains separated from the ambient environment during the cooking process.

The non-venting film overwrap 158 may have one or more of the following properties:

Heat deflection temperature (66 psi): at least 400° F.
Heat deflection temperature (264 psi): at least 160° F.
Melting point: at least 420° F.
Elongation fail percentage: 150-170%

Such film overwraps may include those produced by the KNF Corporation.

Such properties may enable the film 158 to expand to a certain degree under heating while maintaining its structural integrity and avoiding rupture. This allows the cooking apparatus 102 to maintain the sealed, non-venting environment in which the temperature and pressure can be increased during the cooking process. Such capabilities may provide for the pressure cooking of the food items 104. Because waters boiling point increases as the surrounding air pressure increases, the pressure built up inside the food packaging allows the liquid in the packaging to rise to a temperature higher than 212° F. before boiling, thereby providing elevated cooking temperatures resulting in reduced cook times.

The cooking apparatus 102 may be sold individually with no food items 104. The cooking apparatus 102 may be contained in a package 106 and sold individually as illustrated in FIG. 12. By selling the cooking apparatus individually, the consumer may utilize the cooking apparatus with food items of his or her choosing or with prepackaged food items designed specifically for the cooking apparatus 102.

In addition to the descriptions of the varying configurations, the cooking apparatus may contain a cooking bag containing a food item, such as sauce, that is immersed in the heated liquid for cooking. Further, in addition to the descriptions of the varying configurations, the cooking apparatus may contain multiple cooking bags containing varying food items, such as sauce and proteins, that are immersed in the heated liquid for cooking.

The food items 104 may be stored in the cooking tray 140. A film seat 134 may be utilized to keep the food items fresh in the cooking tray or a compartment of the cooking tray. An edible adhesive may be utilized. Food items 104 cooked in the cooking tray 140 may be enclosed in cooking bags 108 for cooking and/or storage. The food items 104 may be contained in a food item packet 152 during storage and removed and placed into the cooking tray, cooking bag, cooking film, or heated liquid before cooking.

The food product 100 may be vacuum packed, or filled with other suitable inert gasses, such as $CO_2$, $N_2$, $CO$, $O_2$, or blends thereof. Because oxygen may cause oxidation and/or degradation of the food items, removing oxygen from the food product 100 may prevent this interaction and increase the shelf-life of the food product 100.

The cooking apparatus 102, the cooking tray 140, and/or the cooking bags 108 may be opened with a designed opening means 144, with scissors, and/or by applying a reasonable amount of force. The cooking apparatus 102, the cooking tray 140, and/or the cooking bags 108 may have numerous opening means 144. Cooking apparatus 102, the cooking tray 140, and/or the cooking bags 108 may comprise a resealable opening means 146 as illustrated in FIG. 9. Cooking apparatus 102, the cooking tray 140, and/or the cooking bags 108 may be opened for the addition of liquid to hydrate a partially dehydrated sauce or a dehydrated sauce prior to cooking.

The cooking apparatus 102, the cooking tray 140, and/or the cooking bags 108 may comprise opening means 144 such as a partial tear beginning, a line or strip pulling means, a weakened portion, a frangible opening mechanism, a dissolving opening mechanism (or an edible opening mechanism), a rip seal, a complementary tooth and grove system, or a zipper seal. This list is exemplary only and is not meant to be restrictive of the disclosure. It is contemplated that a variety of suitable opening means 144 and resealable means 146 that are capable of staying resealed through cooking may be utilized without departing form the scope and intent of the disclosure. A line strip opening means 144 is illustrated in FIG. 2.

The different types of food items 104, such as sauces, starches, proteins, fruits, vegetables, and/or any edible liquid, may be utilized in varying combinations and forms. A fruit and/or vegetable may comprise any edible portion of a plant. Typically, a fruit is any edible seed bearing part of the plant and a vegetable is any edible non-seed bearing part of the plant. Fruits may comprise apples, apricots, avocado, bananas, strawberries, blueberries, raspberries, cherries, grapefruit, grapes, kiwi fruit, lemons, limes, mangoes, nectarines, oranges, peaches, pears, papaya, pineapple, plums, prunes, raisins, tangerines, cantaloupe, honeydew, and watermelon. Further, vegetables may comprise bok choy, broccoli, collard greens, dark green leafy lettuce, kale, mesclun, mustard greens, romaine lettuce, spinach, turnip greens, watercress, acorn, squash, butternut squash, carrots, hubbard squash, pumpkin, sweet potatoes, black beans, black-eyed peas, garbanzo beans (chickpeas), kidney beans, lentils, lima beans (mature), navy beans, pinto beans, soy beans, split peas, tofu (bean curd made from soybeans), white beans, corn, green peas, lima beans (green), peanuts, potatoes, artichokes, asparagus, bean sprouts, beets, brussel sprouts, cabbage, cauliflower, celery, cucumbers, eggplant, green beans, green or red peppers, iceberg (head) lettuce, mushrooms, okra, onions, parsnips, tomatoes, turnips, wax beans, and zucchini. It will be appreciated that this list is not exhaustive and is not meant to be restrictive. Thus, other fruits and vegetables may be utilized without departing from scope and spirit of the disclosure.

The food product may utilize only one type of fruit or one type of vegetable. If varying types of fruits and/or vegetables are utilized in the food product 100, they may be cooked by boiling the heatable liquid to substantially contemporaneous completion in separate cooking bags 108, separate cooking trays 140, or compartments 124 or together in one cooking tray 140, compartment 124, and/or cooking bag 108.

The food product 100 may utilize proteins. Proteins may comprise any ingestible tissue of mammals, birds, reptiles, or fish. A protein therefore includes, but is not limited to, tissue derived from cattle, porcine, poultry, ruminant (e.g. bison, and deer), and fish sources. If varying types of protein are utilized in the food product 100, they may be cooked by boiling the heatable liquid to substantially contemporaneous completion in separate cooking trays 140, compartments 124, and/or cooking bags 108 or together in one cooking tray 140, compartment 124, or cooking bag 108.

The food product 100 may utilize starches. Starches comprise any food item that is made with flour, such as breads (leavened or unleavened), or any food items that have high concentrations of complex carbohydrates that are insoluble in water, such as pastas, potatoes, and rice. If varying types of starches are utilized in the food product 100, they may be cooked by boiling the heatable liquid to substantially contemporaneous completion in separate components or cooking trays 140, compartments 124, and/or cooking bags 108 or together in one component or cooking tray 140, compartment 124, or cooking bag 108. It is contemplated that certain food items 104 may be applicable to more than one of the listed types of food items 104, such as potatoes, which may be classified as a vegetable or a starch or such as sauce, which may be classified as a sauce and/or a liquid.

The food product 100 may utilize a sauce. Typically, consumers find the utilization of sauce in a food product ascetically pleasing. The sauce may be contained in a cooking bag 108. The sauce may be contained in a cooking tray 140 or compartment 124. The sauce may be contained in a stand up cooking bag 108. If the sauce, in not contained a moisture impermeable structure, the sauce may add water vapor to the cooking process and create convection current during heating to decrease the cook time for the particulates.

The sauce may be in multiple forms. The sauce may be hydrated, partially hydrated, or dehydrated. The dehydrated sauce may be held together by binders, such as gums, starches, and/or any other suitable binders know by those skilled in the art. The hydrated sauce may be frozen in one large block or in multiple smaller blocks. The frozen sauce may be granulated, chunked, shaved, cubed, or chipped. A nitrogen filled roller may be utilized to freeze the sauce into a thin sheet that is chipped and put into the cooking apparatus 102. The frozen sauce may be contained in a compartment 124, a cooking tray 140, or a cooking bag 108.

The sauce may be partially hydrated in the form of a paste, a concentrate, or a gel. The sauce may be dehydrated in the form of a matrix, leather, or powder. The dehydrated sauce includes a dry mix of ingredients that may be hydrated to form a sauce. The dehydrated sauce or the partially dehydrated sauce may require that liquid be added prior to or after cooking in order to fully or partially hydrate the sauce. A consumer may control the thickness/viscosity of a sauce by controlling the amount of liquid added to a partially hydrated or dehydrated sauce.

The liquid or heatable liquid that is brought to a boil in the cooking device may be included in the food product 100 as a frozen block of liquid, in multiple smatter blocks of frozen liquid, in a separate cooking bag 108, in a compartment 124, in a food item packet, or in a cooking tray 140. When the liquid is contained in a separate cooking bag 108, the cooking bag may be frangible or made of an edible dissolvable material to release the liquid into the partially hydrated or dehydrated sauce during cooking. The liquid or the heatable liquid may be any edible liquid, such as a dairy based liquid (i.e., milk or cream), an alcoholic beverage (i.e., beer or wine), a meat stock, a meat broth, an oil, a soda, sauce, water, or juice. This list is exemplary only and is not meant to be restrictive of the disclosure. It is contemplated that a variety of edible liquids may be utilized without departing from the scope and spirit of the disclosure.

The liquid or heatable liquid may be added by the consumer. The liquid is added directly to the cooking tray 140, cooking bag 108, or compartment 124 containing the partially hydrated or dehydrated sauce. The liquid is poured through a perforated cooking bag 108 or perforated cooking tray 140 over other food items 104, such as fruits and/or vegetables to drain into the cooking bag 108, cooking tray 140, compartment 124, and/or cooking device 136 containing the partially hydrated or dehydrated sauce. When food items 104 are frozen, pouring liquid over them to hydrate the sauce helps to defrost the frozen food items 104, lowering cooking time for a more convenient and better tasting product. The added liquid may be warm or boiling. The cooking tray 140, compartment 124, and/or cooking bags 108 are opened for pouring in liquid and then resealed with a resealable opening means 146. The heatable liquid is added directly to the consumer device and heated to boil to cook the food items contained in the cooking apparatus.

The partially hydrated or dehydrated sauce may comprise a foundational blend that allows the consumer to add his or her own ingredients or liquids to customize the sauce to his or her individual tastes or allows the customer to follow a myriad of different sets of recipes provided with the food product. The sauce may be able to change from a red sauce to a white sauce for different pasta dishes based on a consumer added ingredient or a choice of ingredients found with the food product 100.

Water may be obtained during cooking from the moisture contained in other food items 104 as illustrated in FIG. 11. When food items 104 such as fruits and/or vegetables cook they may excrete water and this excreted water may be directed to hydrate the partially hydrated or dehydrated sauce. The food items 104 such as fruits and/or vegetables may be coated with a water glaze 154. The water glaze 154 may melt from the food items 104 upon heating and directed to hydrate the partially hydrated or dehydrated sauce as illustrated in FIG. 11. In addition to hydrating the sauce, the water glaze 154 may protect the flavor of food items 104 during processing, cooking, and storing. Nutrients that leech out of the food items 104 with the water during cooking may be recaptured in the sauce to maintain the nutrients of the food product 100.

Because food items 104 may excrete water when cooked, the sauces should be formulated to account for various changes in moisture that may occur during cooking when the sauce is not contained in a separate closed liquid impermeable cooking tray 140, cooking bag 108, or compartment 124, based on the packaging configuration. The sauces' moisture content may be formulated to produce optimal viscosity after cooking. A film or coating may be utilized that absorbs excess or unwanted liquid.

Several benefits are associated with the utilization of a partially hydrated or dehydrated sauce. The cost of adding the liquid is saved. Further, because less liquid is contained in the food product 100, the overall weight of the food product 100 is reduced decreasing the cost of shipping the food product 100. Third, if the food product 100 is frozen, the utilization of dry sauce will decrease cooking time because the sauce will not need to be thawed making the product more convenient. Fourth, if the food product 100 is frozen, the sauce will not have to be selected from sauces with lower freezing points to prevent the sauce from thawing prematurely and creeping into unintended areas. Fifth, partially hydrated and fully hydrated sauces may not need to be precooked; therefore, the sauce will be fresher and taste better when the sauce is cooked for the first time by the consumer.

The sauce may be separated from all of the other types of food items 104. There are several advantages to separating the sauce. First, if vegetables and/or fruits are part of the food product 100, the vegetables and/or fruits do not need to be blast frozen. Typically, if the sauce is on the fruits and/or vegetables, the fruits and/or vegetables are individually quick frozen (IQF), the sauce is poured onto the fruits and/or vegetables, and the combination is blast frozen. Because the sauce of the disclosure may be frozen separate from the fruits and/or vegetables of the disclosure, the fruits and/or vegetables are only IQF with no need for blast freezing. Additionally, a four day hold period that is typically associated with the blast freezing of fruits and/or vegetables and sauce is eliminated by sauce separation. The elimination of blast freezing during processing also prevents the cells in the fruits and/or vegetables from being overly strained and damaged during the freezing and thawing caused by the application of sauce to IQF fruits and/or vegetables prior to blast freezing. This creates a better resulting texture and/or flavor in the fruits and/or vegetables. Therefore, the food product 100 may be produced more efficiently by eliminating the four day hold period and is produced with higher quality taste by maintaining the integrity of cell structures over products that do not separate sauce from fruits and/or vegetables in a prepackaged product.

Further, when the sauce is heated and the sauce contacts other food items, the heated sauce may damage and/or degrade the other food items. The separation of the sauce prevents contact between the sauce and the other food items to prevent damage to the other food items.

The food product 100 may contain a separate cooking bag, a compartment 124, or a separate food item packet 152 of seasonings to allow the food service industry, a family, or an individual to decide how much, if any, seasoning (e.g., salt) is desired in a given snack or meal. Seasonings may be withheld by a consumer to increase the health of the meal. The seasoning may be immersed in a liquid during cooking to provide specific flavors and aromas to food items cooked by the liquid's steam. These steam flavoring formulations may be provided in the liquid, in a frangible or dissolvable (edible) cooking bag, in cheese cloth, or in another suitable containment structure. If the steam flavoring formulations are in their own separate cooking bag 108, compartment 124, or food item packet 152, the consumer can choose to include or exclude the flavoring. Moreover, the steam flavoring formulations may be applied to a portion of the meal or to the whole meal based on the configuration of the utilized cooking apparatus 102. Water combined with the steam flavoring formulations may be utilized to cook the vegetables, while steam from a sauce may be utilized to cook a meat or starch. The steam flavoring formulations may comprise Sachet D'epices (i.e., three to four parsley stems, one sprig thyme, one bay leaf, and one teaspoon of cracked peppercorns in one gallon of liquid); Bouquet Garni (i.e., one sprig thyme, three to four parsley stems, one bay leaf, and two to three leek leaves or one celery stalk cut crosswise in half in one gallon of liquid); and/or Onion Pique (i.e., one-fourth of a peeled onion sliced half way down to its center to hold a bay leaf and three whole cloves.

The food product 100 may contain a garnish. A garnish is an edible food or drink that is added to a dish, meal, or snack for decoration. Typically, the garnish is configured or cut to be visually pleasing (e.g., in the shape of a flower or an animal). The garnish may be removed before cooking or cooked. The garnish may be contained in a cooking bag 108, compartment 124, or cooking tray 140 if cooked. A garnish may comprise herbs, seasonings, fruits, and/or vegetables. This list is exemplary only and is not meant to be restrictive of the disclosure. It is contemplated that a variety of edible products may be utilized without departing from the scope and intent of the disclosure.

In general, different food items of the disclosure may be stored and or cooked separately. Food items of differing types may be combined in one cooking tray 140, compartment 124, or cooking bag 108. The sauce may contain particulates of other types of food items, such as protein, fruits, and/or vegetables. The sauce protects the particulates from freezer burn, but may increase the cooking time of the food product 100. The particulates may be contained in separate cooking bags, food item packets 152, cooking trays 140, and/or compartments 124. The cooking bag 108 may be edible and/or frangible and release the particulates into the sauce during cooking, or the consumer may choose to remove the particulates from or add the particulates to the sauce.

A cooking tray 140, a compartment 124, and/or a cooking bag 108, such as a mesh bag 118, may contain protein and a fruit and/or a vegetable. Starches and fruits and/or vegetables may be contained in the same cooking tray 140, compartment 124, and/or cooking bag 108, such as tomatoes, potatoes, and green beans. At least one food item may be separated from at least one other food item type during processing, storing, or cooking.

The quantity/size of the cooking apparatus or the food product may be adjusted to provide for an individual, a family, and/or the commercial food service industry. A cooking apparatus 102 may comprise serving sizes from 6 oz. to 96 oz. Furthermore, the food product 100 may be distributed in several ways. A case of varying or the same individually sized meal may be compiled and sold. Varying numbers of different individual sized meals may be sold to accommodate families of different numbers. The customer may be able to select the combination of different individually sized meals, meal components, or ingredient combinations though a counter with a person (such as a kiosk), by ordering on-line, or via a vending machine. The food product may be designed and packaged to feed entire meals to large groups of people. The meals may be designed to accommodate children, adults, and/or specific dietary constraints, such as weight loss and heart healthy needs. The food product 100 may include plates, utensils, and/or napkins for consumers who plan on consuming their meal away from home, such as at the office.

In order to provide simultaneous cooking of differing food items, the cooking apparatus may be insulated, vacuumed packed, arranged in a specific configuration, or nitrogen (or other suitable inert gas or combination of gases) flushed to finish cooking varying foodstuffs at the same time. The cooking apparatus may additionally contain microwave focusing and/or shielding technology to provide simultaneous cooking of differing food items. All of these techniques may be utilized individually or in combination to finish cooking varying foodstuffs at the same time.

The food items 104 of the food product 100 may be selected to provide a snack or meal. The food items 104 contained in the food product 100 may be selected to provide a portion of a meal, multiple portions of a meal, or a whole meal. The food product 100 may comprise an appetizer. The food product 100 may contain a plurality of different appetizers, such as potato skins, buffalo wings, and mozzarella sticks. The food product 100 may contain a plurality of different side items, such as rice, beans, vegetables, and grits. The food product 100 may contain a dessert or a plurality of different desserts. This list is exemplary only and is not meant to be restrictive of the disclosure. It is understood that a variety of edible products may be utilized without departing from the scope and intent of the disclosure.

The disclosure may provide numerous advantages over the prior art by separating the different food items. This separation leads to significant improvements in food quality, including improvements in texture, hold life, color, and flavor.

Figure 16:
FIG. 16 is an isometric view illustrating the food items produced by the food product after cooking plated in a mixture configuration.
Figure 17:
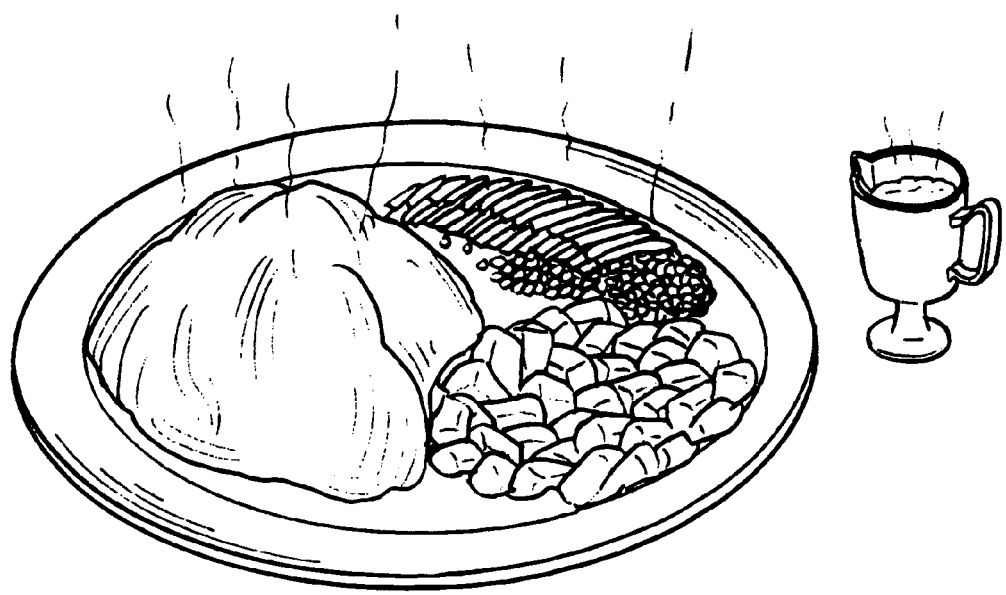
FIG. 17 is an isometric view illustrating the food items produced by the food product after cooking plated in a configuration that separates the different food items.

Separate cooking produces a food product that may be plateable. Plateability allows the consumer to choose between different food items and/or sauces that are cooked simultaneously. Therefore, an individual may plate, assemble, and customize their meal according to his or her preferences and tastes. Moreover, plateability allows food to be placed on a plate or cooking tray 140 in different visually appealing configurations. Further, if an individual is allowed to plate his or her own meal, the food product 100 allows each individual to sort out unhealthy items if desired. The consumer may choose to plate his or her cooked food items in a mixture configuration as illustrated in FIG. 16. The consumer may utilize the cooking apparatus to plate different food items including sauce separately as illustrated in FIG. 17.

Cooking apparatus 102 may provide several thermodynamic advantages in cooking by separating the different types of food items 104 to create a more appetizing and higher quality food product. Separating the food item increases the surface area of the food items by total volume. The increased surface area increases the surface area to which heat may be transferred resulting in greater efficiency in cooking. Further, the thickness of the food is decreased, allowing for shorter cooking times and more even cooking.

Moreover, the density of the food item 104 is decreased allowing the heating apparatus (e.g., microwave oven or convection oven) greater access to the center of the food items 104 for better and faster cooking times. Additionally, the food items 104 are not as densely packed, allowing the food items 104 to be more effectively heated with better heat transfer also helping to shorten cooking times. Typically, the less cooking time utilized, the less heat degradation of the food product.

Furthermore, the cooking trays 140 and/or cooking bags 108 may be configured to allow food items that require more heat to cook, to receive more heat and food items that require less heat to cook, to receive less heat to prevent undercooking and/or overcooking of the food items by insulating the food items that require less heat with other food items that require more heat, as illustrated in FIG. 16.

The cooking apparatus 102 provides several storage advantages by separating the different types of food items to produce a more appetizing and higher quality food product. The separation of food items 104 helps to prevent degradation and discoloration during storage from the interaction of differing types of food items. Further, separation of food items in multiple cooking bags 108, cooking trays 140, and/or compartments 124 may help to prevent freezer burn when the food product 100 is stored in a freezer.

The cooking apparatus 102 provides several processing advantages by separating the different types of food items to produce a more appetizing and higher quality food product. The separate components or cooking trays 140, compartments 124, and cooking bags 108 allow different types of food items to be processed including manufacturing and freezing separately. Differing types of food items require different processing including filling, manufacturing, and freezing, while extra processing may have negative effects on the quality of the food items by effecting texture, color, and the flavor of food items. Therefore, by separating the differing types of food items, each type of food item may get the exact amount of processing required producing a better tasting and higher quality food product.

Separation of the different types of food items may also provide enhanced control of the moisture levels and ultimately, the quality of the food ingredients. Individually quick frozen (IQF) foods may be placed in the perforated cooking bag 108, an inclined compartment 124 with a liquid permeable divider 126, or a perforated cooking tray 140 separated from other food ingredients. As the IQF foods thaw, moisture can drain from the perforated cooking bag 108 or the perforated cooking tray 140, or the compartment 124 with a liquid permeable divider 126 and into another cooking bag 108, cooking tray 140, or compartment 124 as illustrated in FIG. 11. This keeps the IQF foods from becoming soggy by sitting in their excreted moisture, and also may ensure that the other food ingredients that require moisture do not dry out.

The cooking apparatus 102 is largely compatible with existing methods of meal preparation in the foodservice industry. The cooking apparatus is designed to fit over or to be placed inside of already utilized cooking devices 136, so there is no need for additional oven space or equipment to prepare the meal. Further, the cooking apparatus 102 allows for the introduction of new food items 104 into the foodservice industry. Currently, breaded items may not meet consumer standards when prepared in foodservice cooking trays 140 that do not provide separation of ingredients. By placing breaded items into a separate cooking bag 108, cooking tray 140, or compartment 124 of the cooking apparatus 102, they may come out crispy instead of soggy. This wilt open up a plethora of new food items for the foodservice industry without excessive changes to current methods.

Separation of the different types of food items also provides decreased freeze times in processing for food products 100 that are freezer stored. The reduced density and increased surface area of the food items provided by the separation of the different types of food items makes the food items freeze faster. The decrease in freeze time reduces over processing and increases the efficiency of producing the product. An increase of efficiency reduces the cost of making the freezer stored food product 100.

It is believed that the disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory explanation thereof, it is the intention of the following claims to encompass and include such changes.

What is claimed is:

1. A cooking apparatus, comprising:
a first cooking tray configured to be nested within a stove top cooking container having a side wall terminating at an upper rim, wherein the first cooking tray includes:
a side wall portion having an upper end and a lower end,
a bottom portion extending from the lower end, wherein the bottom portion includes a first compartment portion and a second compartment portion, wherein the first compartment portion and the second compartment portion are divided by a liquid permeable divider, wherein the bottom portion is inclined to cause fluid flow from the first compartment through the liquid permeable divider into the second compartment, and
a circumferential lip portion at the upper end, wherein the lip portion is configured to extend over, around and outwardly from an upper rim of the stovetop cooking container so that the circumferential lip portion creates a handle for removing the first cooking tray from the stove top cooking container; and
wherein the sidewall portion of the first cooking tray, between the upper end and the lower end, is configured to be oriented below the upper rim of the stove top cooking container when the first cooking tray is nested within the stove top cooking container.

2. The cooking apparatus of claim 1, wherein the side wall portion of the first cooking tray slants inwardly from the upper end to the lower end.

3. The cooking apparatus of claim 1, further comprising:
a second cooking tray configured to be nested between the first cooking tray and the stovetop cooking container, wherein the second cooking tray includes:
a side wall portion having an upper end and a lower end,
a bottom portion extending from the lower end, and
a lip portion at the upper end, wherein the lip portion of the second cooking tray is configured to extend over and around the upper rim of the stovetop cooking container so that a portion of an inner side of the lip portion is adjacent the outer side of the side wall portion of the stovetop cooking container; and
wherein the sidewall portion of the second cooking tray, between the upper end and the lower end, is configured to be oriented below the upper rim of the stove top cooking container when the first cooking tray is nested within the stove top cooking container.

4. The cooking apparatus of claim 3, wherein the bottom portion of the first cooking tray includes a plurality of perforations.

5. The cooking apparatus of claim 4, wherein the bottom portion of the second cooking tray includes a plurality of perforations.

6. The cooking apparatus of claim 5, wherein the side wall of the second cooking tray slants inwardly from the upper end of the second cooking tray to the bottom end of the second cooking tray at a first angular degree, wherein the side wall of the first cooking tray slants inwardly from the upper end of the first cooking tray to the bottom end of the first cooking tray at a second angular degree.

7. The cooking apparatus of claim 6, wherein the second angular degree is greater than the first angular degree.

8. The cooking apparatus of claim 3, wherein the first cooking tray is insulated to have a thermo conductivity less than that the second cooking tray.

9. A cooking apparatus, comprising:
a second cooking container configured to be nested within a first cooking container having a side wall terminating at an upper rim, wherein the second cooking container is constructed of a material suitable for cooking with a secondary heat source, wherein the second cooking container includes:
- a side wall portion having an upper end and a lower end, wherein the side wall portion includes a plurality of perforations,
- a bottom portion extending from the lower end, wherein the bottom portion includes a plurality of perforations, and
- a lip portion at the upper end, wherein the lip portion is configured to extend over the upper rim of the first cooking container; and wherein the side wall of the second cooking container slants inwardly from the upper end of the second cooking container to the bottom end of the second cooking container at a first angular degree, wherein the second cooking container has a thermo conductivity less than the first cooking container, wherein the second cooking container is formed from at least one member of a group: poly(1-butene) and polyethylene.

10. The cooking apparatus of claim 9, wherein the secondary heat source is a steaming heat source.

11. The cooking apparatus of claim 9, further comprising:
a third cooking container configured to be nested between the second cooking container and the first cooking container, wherein the third cooking container is constructed of a material suitable for cooking with the secondary heat source, wherein the third cooking container includes:
- a side wall portion having an upper end and a lower end, wherein the side wall portion includes a plurality of perforations,
- a bottom portion extending from the lower end, wherein the bottom portion includes a plurality of perforations, and
- a lip portion at the upper end, wherein the lip portion of the third cooking container is configured to extend over the upper rim of the first cooking container; and wherein the side wall of the third cooking container slants inwardly from the upper end of the third cooking container to the bottom end of the third cooking container at a second angular degree.

12. The cooking apparatus of claim 11, wherein the second cooking container and the third cooking container are constructed of a plastic material.

13. The cooking apparatus of claim 12, wherein the secondary heat source is a steaming heat source.

14. The cooking apparatus of claim 11, wherein the second angular degree is greater than the first angular degree.

15. A cooking apparatus, comprising:
a second cooking container configured to be nested within a first cooking container having a side wall terminating at an upper rim, wherein the second cooking container is constructed of a material suitable for cooking with a secondary heat source, wherein the second cooking container includes:
- a side wall portion having an upper end and a lower end,
- a bottom portion extending from the lower end, wherein the bottom portion includes a first compartment portion and a second compartment portion, wherein the first compartment portion and the second compartment portion are divided by a liquid permeable divider, wherein the bottom portion is inclined to cause fluid flow from the first compartment through the liquid permeable divider into the second compartment, and
- a lip portion at the upper end, wherein the lip portion is configured to extend over the upper rim of the first cooking container; and wherein the side wall of the second cooking container slants inwardly from the upper end of the second cooking container to the bottom end of the second cooking container at a first angular degree.

16. The cooking apparatus of claim 15, wherein the second cooking container is constructed of a plastic material.

17. The cooking apparatus of claim 16, wherein the secondary heat source is a steaming heat source.

18. The cooking apparatus of claim 15, further comprising:
a third cooking container configured to be nested between the second cooking container and the first cooking container, wherein the third cooking container is constructed of a material suitable for cooking with the secondary heat source, wherein the third cooking container includes:
- a side wall portion having an upper end and a lower end,
- a bottom portion extending from the lower end, and
- a lip portion at the upper end, wherein the lip portion of the third cooking container is configured to extend over the upper rim of the first cooking container; and wherein the side wall of the third cooking container slants inwardly from the upper end of the third cooking container to the bottom end of the third cooking container at a second angular degree.

19. The cooking apparatus of claim 18, wherein the second cooking container and the third cooking container are constructed of a plastic material.

20. The cooking apparatus of claim 19, wherein the secondary heat source is a steaming heat source.

21. The cooking apparatus of claim 18, wherein the bottom portion of the second cooking container includes a plurality of perforations.

22. The cooking apparatus of claim 21, wherein the bottom portion of the third cooking container includes a plurality of perforations.

23. The cooking apparatus of claim 18, wherein the first angular degree is greater than the second angular degree.

24. The cooking apparatus of claim 18, wherein the second cooking container is insulated to have a thermo conductivity less than that the third cooking container.

* * * * *